(12) United States Patent
Becher

(10) Patent No.: US 12,006,868 B2
(45) Date of Patent: Jun. 11, 2024

(54) PULSED SUPERSONIC AIR-TURBINE ENGINE WITH SPEED CONTROL

(71) Applicant: Yona Becher, Budd Lake, NJ (US)

(72) Inventor: Yona Becher, Budd Lake, NJ (US)

( * ) Notice: Subject to any disclaimer, the term of this patent is extended or adjusted under 35 U.S.C. 154(b) by 42 days.

(21) Appl. No.: 17/803,601

(22) Filed: Sep. 6, 2022

(65) Prior Publication Data

US 2023/0193826 A1     Jun. 22, 2023

(51) Int. Cl.
*F02C 7/00*     (2006.01)
*F02C 3/04*     (2006.01)
*F02C 7/057*     (2006.01)

(52) U.S. Cl.
CPC ............ *F02C 7/057* (2013.01); *F02C 3/04* (2013.01); *F05D 2220/32* (2013.01); *F05D 2260/42* (2013.01); *F05D 2260/60* (2013.01)

(58) Field of Classification Search
None
See application file for complete search history.

(56) References Cited

U.S. PATENT DOCUMENTS 11,608,605 B1 *    3/2023    Becher .................. F03B 13/264

\* cited by examiner

*Primary Examiner* — Edwin Kang

(57) ABSTRACT

An electronic speed-controlled pulsed supersonic turbine engine powering automotive, drone, and electric power generation, energized by breathable, clean renewable energy airflow from 2700 psi integral air-tank energizing the engine continuously for 3 hours, replacing the toxic fossil gasoline-diesel energized internal combustion engine with carbon emissions that affect climate change. The turbine blades are turned by the pulsed impulse of supersonic airflow from sequentially energized eight manifolds of de Laval convergence-divergence-CD with sonic choking nozzle and supersonic divergence airflow impulsing turbine blades turning them within divergence shroud to atmospheric pressure with turbine nose with engine output shaft supported with bearings supported by the air-tank. An electric pulse generator controls engine shaft speed with voltage pulses to solenoid valves commanding spool valves with airflow from the air-tank with output shaft magnetic speed sensing signal sent back to controller in closed loop adjusting to desired set with pulse amplitude and time duration.

1 Claim, 43 Drawing Sheets

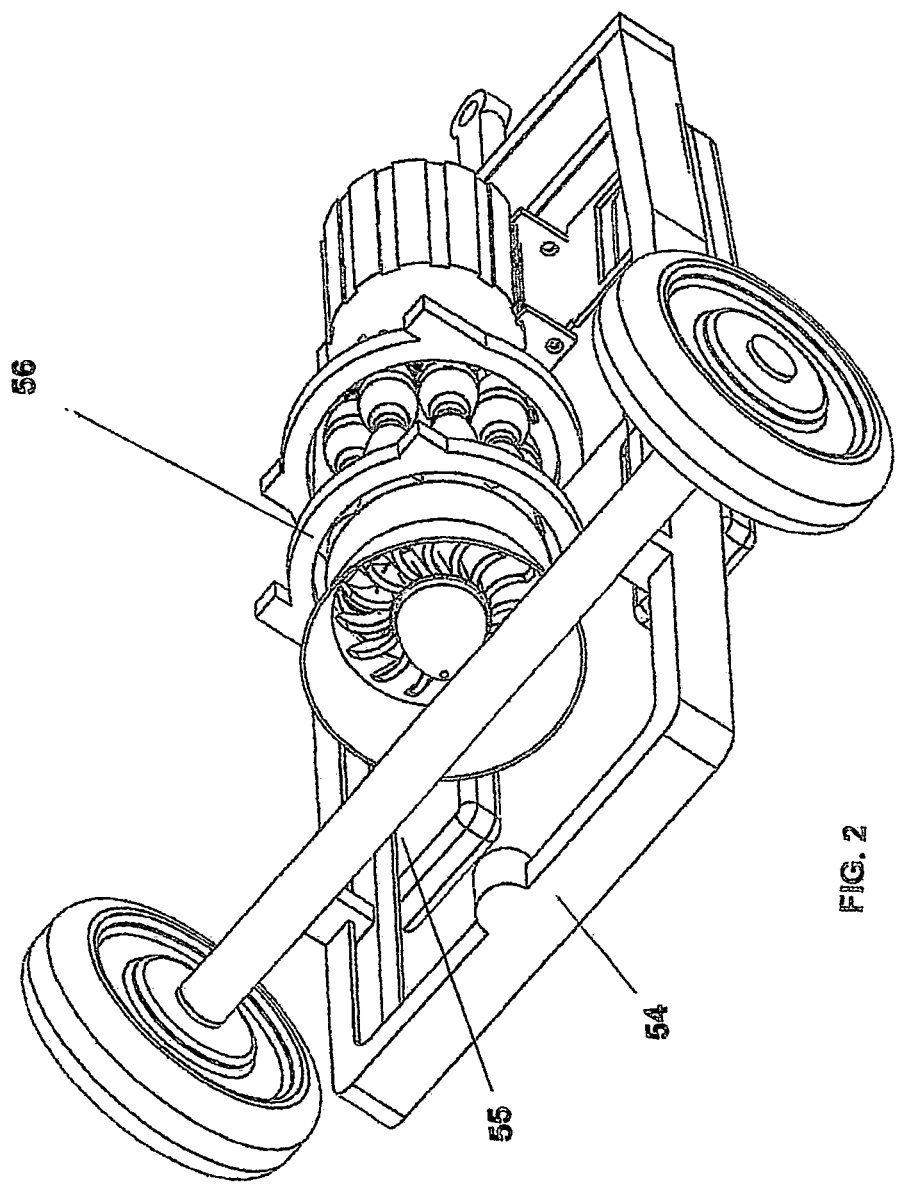

PULSED SUPERSONIC AIR-TURBINE ENGINE WITH SPEED CONTROL

BACKGROUND OF THE INVENTION

An engine is a machine designed to convert one or more forms of energy into mechanical energy. A turbine is a rotary mechanical device that extracts energy from a fluid flow and converts it into useful work. The work produced by a turbine can be used for propulsion and generating electrical power when combined with a generator. A turbine is a turbomachine with at least one moving part called a rotor assembly, which is a shaft or drum with blades attached. High-speed airflow such as supersonic airflow acts on the blades so that they move and impart rotational energy to the rotor. The primary advantage of a clean breathable air turbine engine is its toxic-free renewable energy source of nature and very low power-to-weight ratio as well as power-to-price ratio. Since significant useful work can be generated by a relatively lightweight renewable energy engine, air turbines are perfectly suited for an automotive, electric generator, drone, and boat propulsion. Similarly, a turbine engine is significantly cheaper than an internal combustion piston engine which produces harmful toxic emissions to human beings and animals.

Compressed air renewable energy can be produced by offshore ocean hydro-turbine units as an energy source to energize a fuel-free pulsed supersonic turbine engine. The global climate change crisis on the globe demands new clean renewable energy solutions replacing fossil fuel internal combustion engines, aiming at reducing the creation of $CO_2$. In addition, moving cars and trucks require a mobile source of energy that provides energy for a predetermined time of distance. Cars using internal combustion engine are equipped with gasoline or diesel fuel-tank that provides fuel for running the engine for a predetermined distance usually about 300 miles range without refueling. Similarly, electric cars are equipped with a large Lithium battery that provides electrical energy to the electric motors of the car for traveling a predetermined distance. For comparison, for automotive diesel engines, the maximum pressure is about 2900 psi. Furthermore, in automotive gasoline engines, peak cylinder pressures are in the range of 300 psi for engines at light loads, to 1000 psi for production engines at full power to 1500 psi or greater for race engines. This is where the engine's power comes from, as it forces the piston down.

The use of De Laval choking sonic nozzle with a divergent manifold that accelerates sonic to supersonic airflow therefore applies to the turn moment on the turbine blades which is the source of the energy needed to run the output shaft of the engine. The goal of a choking nozzle is to increase the kinetic energy of the airflow to sonic $M=1$ converting pressure and internal energy available from the extremely high air pressure air tank of the engine.

The stored compressed air renewable energy in mobile tanks is much safer and much cheaper than the high-energy lithium-type battery which is used in electric cars. Electric cars stored huge amounts of electrical explosives and shocking energy and usually support 300 miles of car travel or 3 hours of traveling time. Nevertheless, lithium batteries are 0.15 to 0.3 kg of lithium per kWh which means hundreds or thousands of pounds of weight for a car battery. It therefore adds much weight to the vehicle which increases the energy consumption. In addition, a lithium battery costs thousands of dollars to replace at special facilities, hundreds of dollars to remove or install and it can cause fire and explosion of the car with danger to the health of the driver and passengers life. Lithium which is a critical ingredient material is imported from China as a controlled single source, therefore controlling the battery and electric cars global market, therefore making any electric car depending on parts from China.

In comparison, clean and breathable compressed air can be produced by hydro-turbines in offshore ocean facilities from the most available and virtually unlimited ocean nature energy of sea winds, sea waves, ocean tidal, and ocean streams energy as described in Reference patent application Ser. No. 17/335,083 dated May 16, 1922.

Clean and breathable compressed air is a renewable energy that is stored in mobile air tanks with no toxic fuel combustion and with no chemical reaction involved replaces fossil gasoline or diesel and other fossil-type energy that needs to be burned by an electric spark inside the internal combustion engine or jet engine into $CO_2$ and other NOX emission gases that present medical health including death to human beings and animals.

A de Laval nozzle or convergent-divergent nozzle, is a tube with a reduced diameter in the middle, making a carefully balanced, asymmetric hourglass shape. It is used to accelerate compressible air to supersonic speeds in the axial thrust direction, by converting the pressure volume and thermal energy of the flow into kinetic energy. De Laval nozzles are widely used in some types of steam turbines and rocket engine nozzles. Convergent-divergent nozzles can therefore accelerate gas that has choked airflow in the divergent section to supersonic speeds.

Available natural renewable energy sources include potential energy which is the energy of the Earth's, Moon's, and Sun's gravitational field as exploited in tidal hydro turbine generation, heat geothermal energy causing water streams in the ocean as harvested in ocean waves, tidal and ocean stream hydro turbines. Other natural processes include atmospheric pressure variations that convert the environmental heat effect on ocean water temperature difference into the wind which can be harvested by ocean wind turbines and hydro-turbines.

The flow velocity when entering the convergence chamber manifold from the extremely high-pressure air-tank outlet port through the flow control of a solenoid valve and amplified into a high airflow through the pressure commanded spool valve, and flowing into the large diameter chamber is subsonic $M<1$. Then the airflow is funneled into sonic speed Mach=1 speed equal to the speed of sound through the choking nozzle. When entering the divergence cone at low pressure that is lower than 0.528 of the convergence chamber, the airflow speed accelerates to supersonic airflow speed at $1.2>M>1$ which is the air speed before impulsing into the helical turbine blades divergence manifold.

A de Laval nozzle has a convergent subsonic airflow section followed by a choking nozzle with sonic airflow which is accelerated to supersonic airflow in the divergence section, often called a convergent-divergent-CD nozzle. If the nozzle pressure ratio is high enough $>0.528$ as is in the present invention, then the flow will reach sonic velocity at the narrowest point of the nozzle throat. In this situation, the nozzle is said to be choked. Increasing the nozzle pressure ratio further will not increase the throat Mach number above one. Downstream external to the nozzle the flow is free to expand to supersonic velocities. Impulse turbines change the direction of flow of a high-velocity fluid such as supersonic airflow in the present invention. The resulting impulse spins the turbine and leaves the airflow with diminished kinetic energy.

There is no pressure change of the air in the turbine moving blades, as in the case of an air turbine. Before reaching the turbine, the air pressure head is changed to the velocity head by accelerating the air with a nozzle. De Laval turbines use this process exclusively. Newton's second law describes the transfer of energy for impulse turbines.

The primary numerical classification of a turbine is its specific output shaft rotation speed which is the turbine blade speed in the present invention. This number describes the speed of the turbine at its maximum efficiency with respect to the torque, power, and airflow rate. The specific speed is derived to be independent of turbine size, therefore making the present invention suitable for mini-size, small-size, and large air turbines for applications ranging from automotive, drone, electric generators, and boats. This region of supersonic acceleration is terminated by a normal shock wave. The shock wave produces a near-instantaneous deceleration of the flow to subsonic speed.

The speed of the air turbine in the present invention is controlled by an electronic pulse generator controller is a closed loop with an output shaft speed sensor compared with the programmed requested speed. The Electronic Pulse generator sends rectangular voltage pulses adjusted for their length, delay, and repetition rate to eight solenoid valves in a predetermined sequence, with pulses sent to two radially opposing solenoids at a time, before sending a similar pulse to adjacent pair of solenoids. Pulse width, Pulse amplitude, Pulse rise and fall times, and Pulse Repetition rate are controlled by the electronic pulse generator programmable controller.

PRIOR ART

U.S. Pat. No. 8,978,352, dated: Mar. 17, 2015, Inventors: Gabriel L. Suciu, Brian D. Merry, Christopher M. Dye, Michael E. McCune. The invention includes a gas turbine engine with a windmill pump driven by a spool. However, the invention does not relate to a Pulsed Supersonic air turbine engine with speed controlled by an electronic pulse generator at a closed loop.

U.S. Pat. No. 7,751,943, Dated: Jul. 6, 2010, Inventors: Heinz Bollhalder, Michael Habermann, Hanspeter Zinn. The patent relates to the protection of a gas turbine from damage caused by pressure pulsations. However, the invention does not relate to a Pulsed Supersonic air turbine engine with speed controlled by an electronic pulse generator at a closed loop.

U.S. Pat. No. 7,509,207, Date of Patent: Mar. 24, 2009. Inventors: Anil Prasad, Oliver V. Atassi. The patent relates to a method for determining a gas turbine propulsion system to attain selected acoustic wave energy emissions. However, the invention does not relate to a Pulsed Supersonic air turbine engine with speed controlled by an electronic pulse generator at a closed loop.

U.S. Pat. No. 11,608,605, Date of Patent: Mar. 21, 2023, Inventor: Yona Becher, Titled: Offshore Ocean Renewable Energy Hydro-Turbine Unit. The patent relates to producing offshore ocean compressed air energy stored in air tanks and transportable to shore, tapping the nature power of ocean waves, Streams, winds, and tides.

BRIEF SUMMARY OF THE INVENTION

An Electronically speed controlled pulsed supersonic turbine engine energized by a clean breathable air from an extremely high-pressure renewable energy air stored in a mobile air tank with an outlet shaft coupled with automotive input power, or coupled with a generator input shaft, with outlet shaft speed controlled in closed loop using electronically controlled pulse generator controller set to predetermined desired engine output shaft speed, sending short time electrical voltage pulses to the fast-opening solenoid valve and spool valve assembly in the programmable amplitude, frequency, sequence and time duration, An electronic speed controlled pulsed supersonic turbine engine with a wide range of power ranging from 1 to 250 KW, and turbine speed range of 20 to 4000 rpm using clean breathable renewable energy airflow from an up to 2700 psi air-tank pressure, capable of continuous operation for more than 3 hours. The objective of the invention is to replace the toxic fossil gasoline-diesel-energized internal combustion engine. The helical turbine blades are getting pulsed impulse energy of supersonic airflow from sequentially energized eight De Laval convergent-divergent CD nozzle systems, each comprising subsonic convergence inlet, sonic choked nozzle, and supersonic divergence manifold airflow impulsing the turbine blades. The engine output shaft is supported with bearings inside the air-tank center hole. An electric pulse generator controls the rotation speed of the shaft whose speed is sensed by magnets located on a nonmagnetic ring mounted on the output shaft and a magnetic sensor attached to the air-tank extension flange. The electronic pulse generator sends controlled short-duration voltage pulses in a closed loop to solenoid valves that are commanding rapid opening spool valves connecting the manifold to high-pressure airflow from the air tank at the controlled sequence and time duration. The turbine nose is bolted to the inner shroud and bolted to the engine outlet power shaft with a tapered diverging shroud with airflow exiting turbine blades at low speed into the ambient atmosphere.

The pulsed supersonic air turbine engine using high pressure breathable clean air as a renewable energy for a wide range of applications including automotive, drone, electric generator or boat engine. Compressed air is a type of renewable clean energy that is produced by capturing ocean wave, tidal, and stream energy in offshore ocean hydro turbine units or by wind turbine surplus energy during low demand time for electrical energies pumped by screw-type compressors energized by hydro-turbines or at 'surplus time' of a wind-turbine. The extremely high pressure of up to 2700 psi is comparable to the maximum pressure above the piston in an internal combustion engine after ignition of the fuel-air mixture above the piston. The pulsed supersonic air turbine engine, with various output power replaces the internal combustion engine used in cars of all types and sizes and it has the amount of stored compressed gas energy sufficient for continuous operation of the engine for 3 hours which is similar to the equivalent energy of gasoline tank in a regular automotive vehicle.

The speed of the air turbine in the present invention is controlled by an electronic pulse generator controller is a closed loop with an output shaft speed sensor compared with the programmed requested speed. The Electronic Pulse generator sends rectangular voltage pulses adjusted for their length, delay, and repetition rate to eight solenoid valves in a predetermined sequence, with pulses sent to two radially opposing solenoids at a time, before sending a similar pulse to adjacent pair of solenoids. Pulse width, Pulse amplitude, Pulse rise and fall times, and Pulse Repetition rate are controlled by the electronic pulse generator programmable controller.

For automotive engine applications, the outlet shaft of the pulsed supersonic air turbine engine is coupled with the front axle wheels differential gear of the car, using mobile stored energy in the form of extremely high-pressure air tank stored within the engine with auxiliary compressed air tanks attached to the chassis of the care, replacing the internal combustion engine while removing exhaust emission system, gearbox with no idle speed of the engine required. For electric generator engine application, the outlet shaft of the speed-controlled pulsed supersonic air turbine engine is coupled with the input shaft of the electrical generator, using mobile stored energy in the form of extremely high pressure stored within an air tank within the engine with additional auxiliary compressed air tanks attached to the chassis of the generator wheeled frame.

List of Parts and Reference Numbers in the Figures

| Part reference number | Part name description | Figure number location | comment |
|---|---|---|---|
| 11 | Engine output shaft | 17, 18, 28, 30, 31, 32, 34, 37 | |
| 12 | air-tank | 14, 17, 18, 37 | |
| 12a | air-tank front flange | 14, 17, 27, 28, 31, 32, 37 | |
| 12b | air-tank rear turbine support | 17, 18,19 | |
| 12c | air-tank through hole | 18, 26, 27, 30, 31, 34, 37 | |
| 12d | air-tank outlet relief valve | 6, 10, 12, 13, 28, 34 | |
| 12e | air-tank connecting pipe | 6, 10, 12, 13, 34 | |
| 12f | air-tank outlet port | 28, 32 | |
| 13 | outlet shaft Ball bearing | 28, 34, 37 | |
| 14 | Solenoid valve | 28, 32 | |
| 15 | spool valve | 6, 22C, 22D, 33 | |
| 15a | spool valve command port cover | 22D | |
| 15b | spool valve spring cover | 22D, 22F | |
| 16 | spool valve cylindrical spool | 22C, 22F | |
| 16a | solenoid valve & spool valve | 6, 33 | |
| 17 | spool valve body | 22C, 22D, | |
| 17a | spool valve bore | 22C | |
| 18 | spool valve inlet port | 22C, 22D, 22H | |
| 19 | spool valve outlet port | 22C, 22D, 22H | |
| 20 | spool valve command inlet port | 22H | |
| 21 | spool valve command outlet port | 22H, 22F | |
| 22 | spool valve return spring | 22H | |
| 23 | solenoid valve coil | 23 | |
| 24 | solenoid valve body | 22 | |
| 25 | solenoid valve plunger | 23 | |
| 25a | solenoid valve plunger poppet | 23 | |
| 25b | solenoid valve armature | 22, 23 | |
| 26 | solenoid valve return spring | 23, | |
| 27 | solenoid valve seal seat | 23 | |
| 28 | solenoid valve inlet port | 22, | |
| 29 | solenoid valve outlet port | | |
| 30 | manifold | 6, 7, 8, 10, 33, 34, 35 | |
| 31 | convergence manifold chamber | 6, 7, 8, 10, 33, 34, 35 | |
| 32 | choking nozzle | 6, 7, 8, 10, 33, 34, 35 | |
| 33 | divergence manifold chamber | 6, 7, 8, 10, 33, 34, 35 | |
| 33a | turbine outer shroud flow adaptor | 5, 32, 34, 35 | |
| 36 | turbine nose and inner shroud assembly | 35 | |
| 36a | turbine nose radical fins | 14, 37 | |
| 37 | turbine blade | 4, 11, 14, 16, 17, 37, | |
| 39 | turbine divergence shroud | 4, 11, 30 | |
| 43 | electronic pulsed generator | 28, | |
| 45 | turbine ball bearing | 18, 19 | |
| 46 | output shaft speed sensor | 28, 30, 31, 32 | |
| 48 | turbine ball bearing | 18, 31 | |
| 49 | non-magnetic ring and embedded magnets | 31, 32 | |
| 51 | automotive power input | 1A | |

List of Parts and Reference Numbers in the Figures

| Part reference number | Part name description | Figure number location | comment |
|---|---|---|---|
| 52 | generator power input | 2A, 2B, 38 | |
| 53 | automotive chassis | 1A, 1B, 38 | |
| 54 | generator chassis | 2A, 2B, 2C | |
| 55 | auxiliary air-tank | 1B, 2C, 38, | |
| 56 | pulses supersonic air engine | 1A, 2B, 2C | |

BRIEF SUMMARY OF THE DRAWINGS

FIG. 2 presents the top view of an Electronically speed controlled pulsed supersonic turbine engine

DETAILED DESCRIPTION OF THE INVENTION

Figure 1:
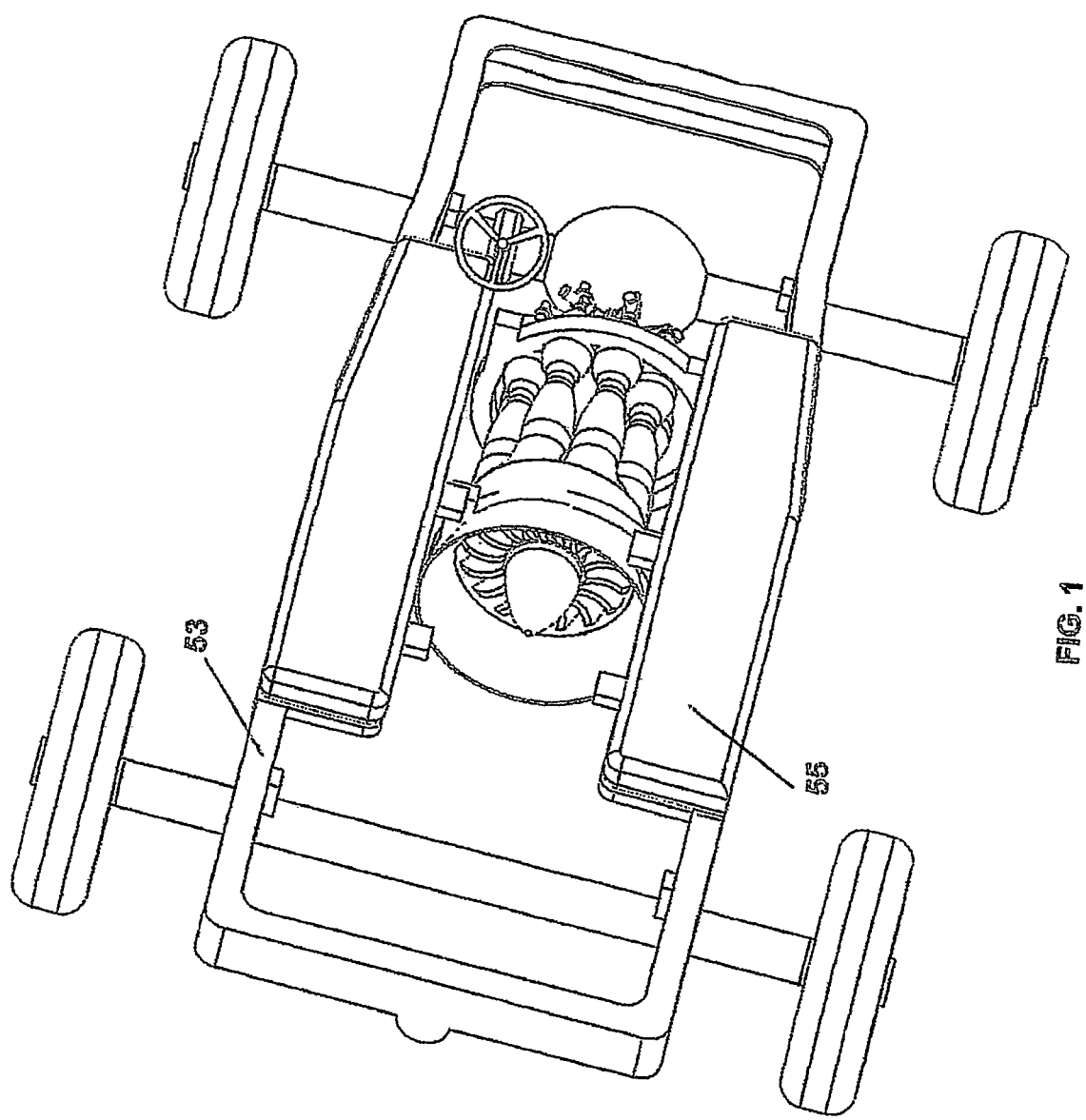
FIG. 1 presents the top view of an Electronically speed-controlled pulsed supersonic turbine engine installed in automotive application
Figure 1A:
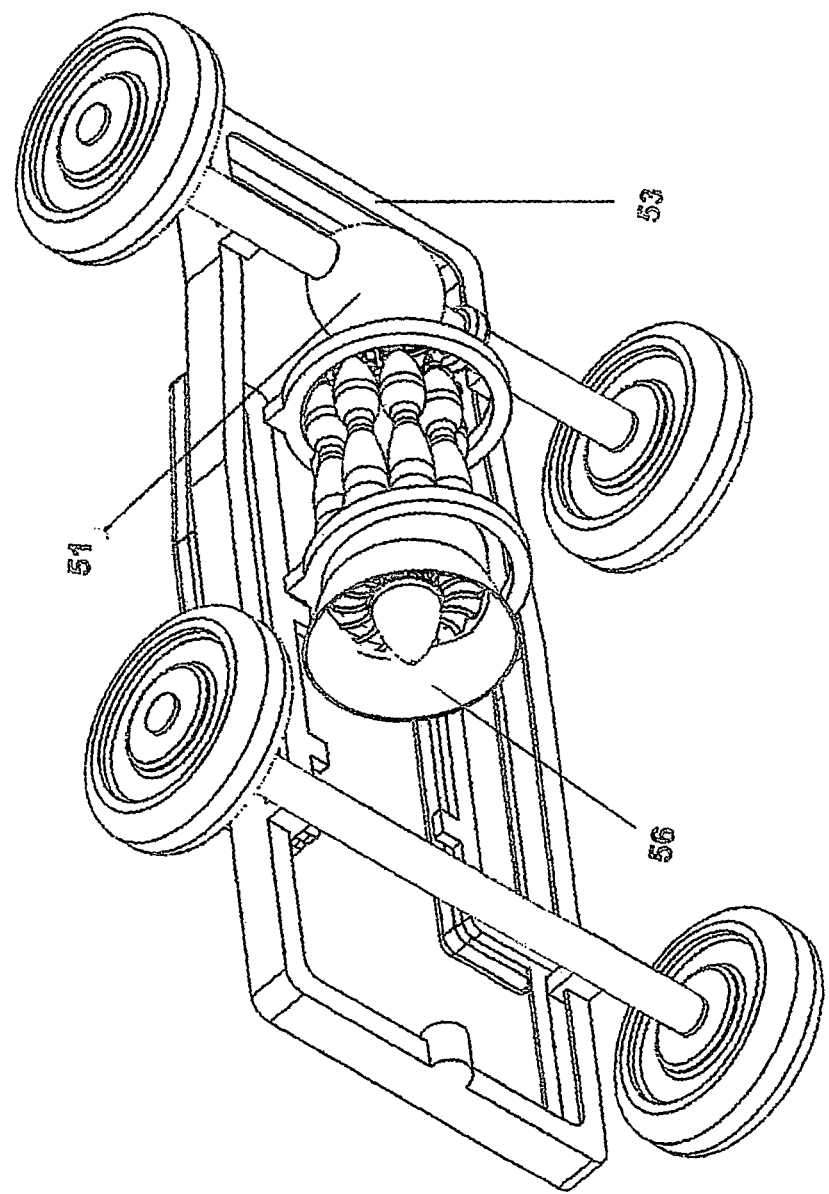
FIG. 1A presents the side view of an Electronically speed controlled pulsed supersonic turbine engine installed in automotive application
Figure 1B:
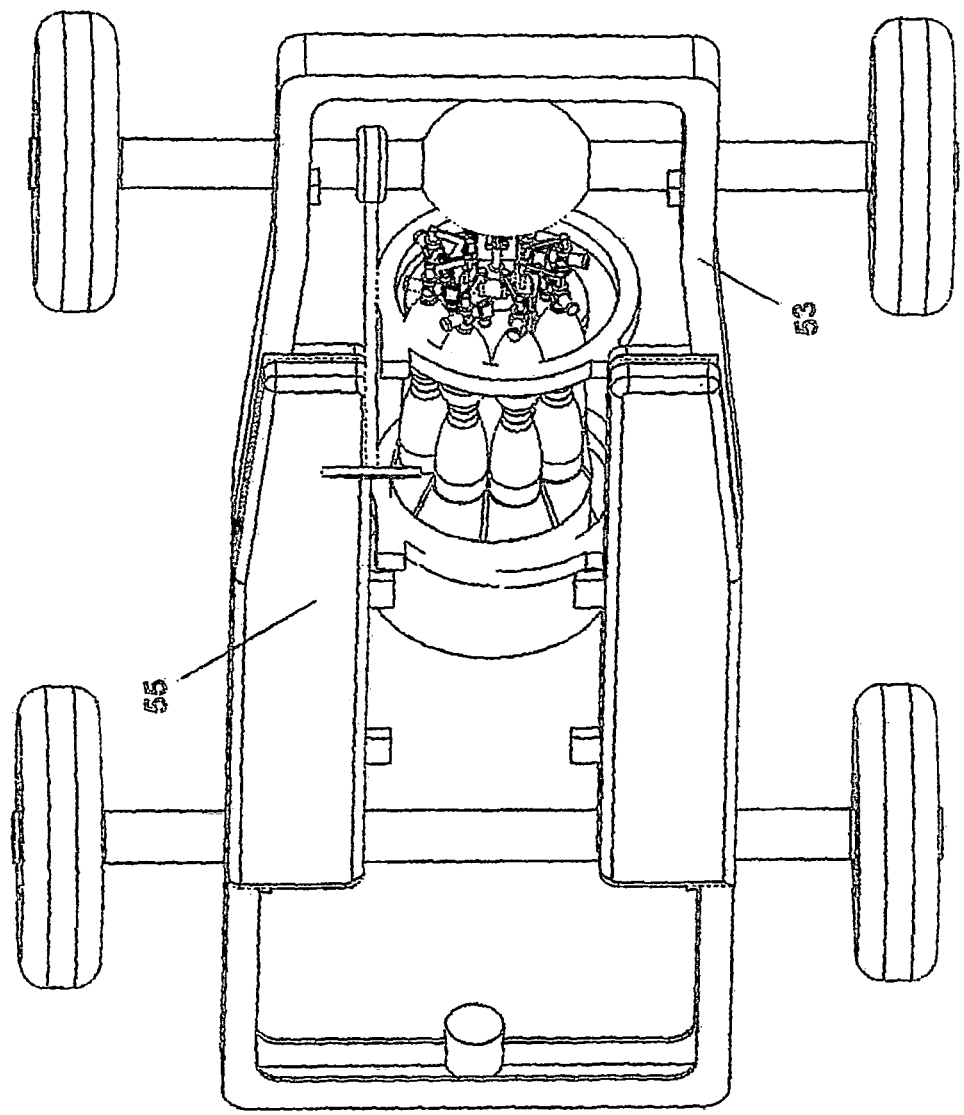
FIG. 1B presents the top view of an Electronically speed controlled pulsed supersonic turbine engine installed in an electrical power generator application

An Electronically speed-controlled pulsed supersonic turbine engine 56 energized by clean breathable air from an extremely high-pressure renewable energy air stored in mobile air-tank 12 with engine outlet shaft 11 coupled with automotive input power, or coupled with generator input shaft, with outlet shaft 11 speed controlled in closed loop using electronically controlled pulse generator controller set to predetermined engine output shaft speed, sending short time electrical voltage pulses to the fast-opening solenoid valve and spool valve assembly 16 in the programmable amplitude, frequency, sequence and time duration, FIG. 1 and FIG. 1A presents a top and a front view respectively of an electronic speed-controlled pulsed supersonic turbine engine 56 for automotive input power 51 energized by clean renewable energy from an extremely high-pressure air stored in mobile air-tank 11 with outlet shaft coupled with automotive input power with outlet shaft speed control.

Figure 2A:
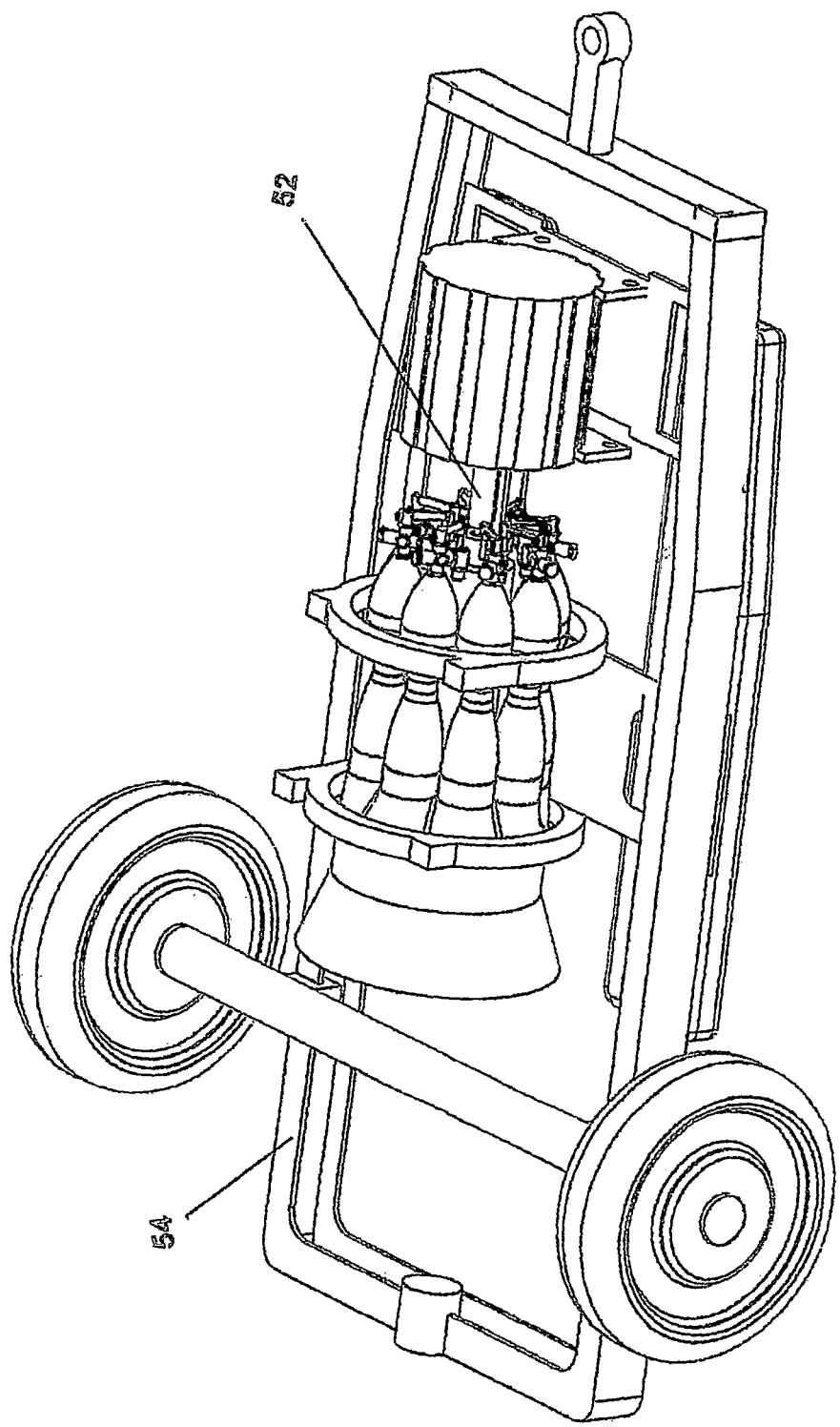
FIG. 2A presents the front view of an Electronically speed controlled pulsed supersonic turbine engine
Figure 2B:
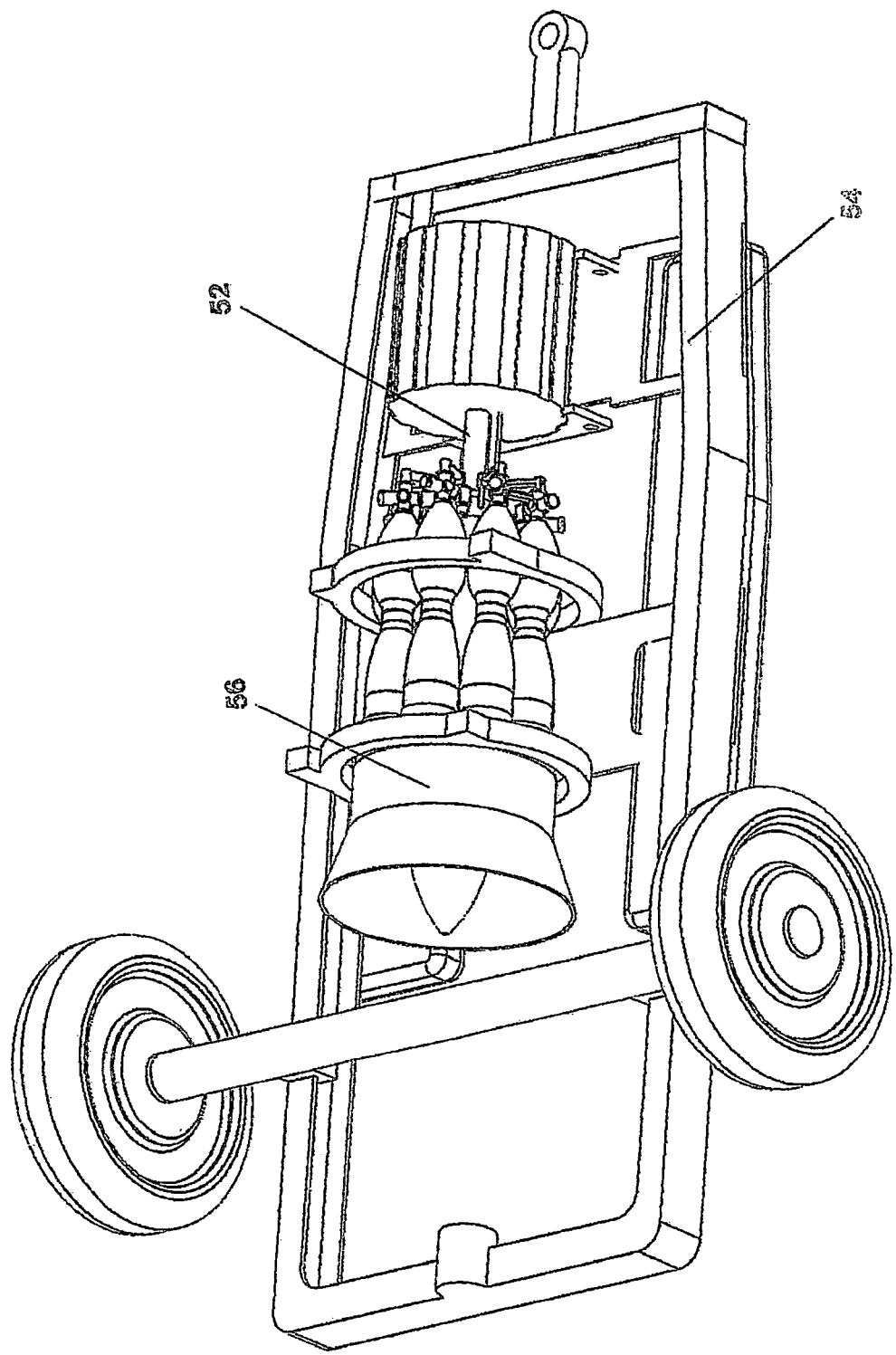
FIG. 2B presents the back view of an Electronically speed controlled pulsed supersonic turbine engine
Figure 2C:
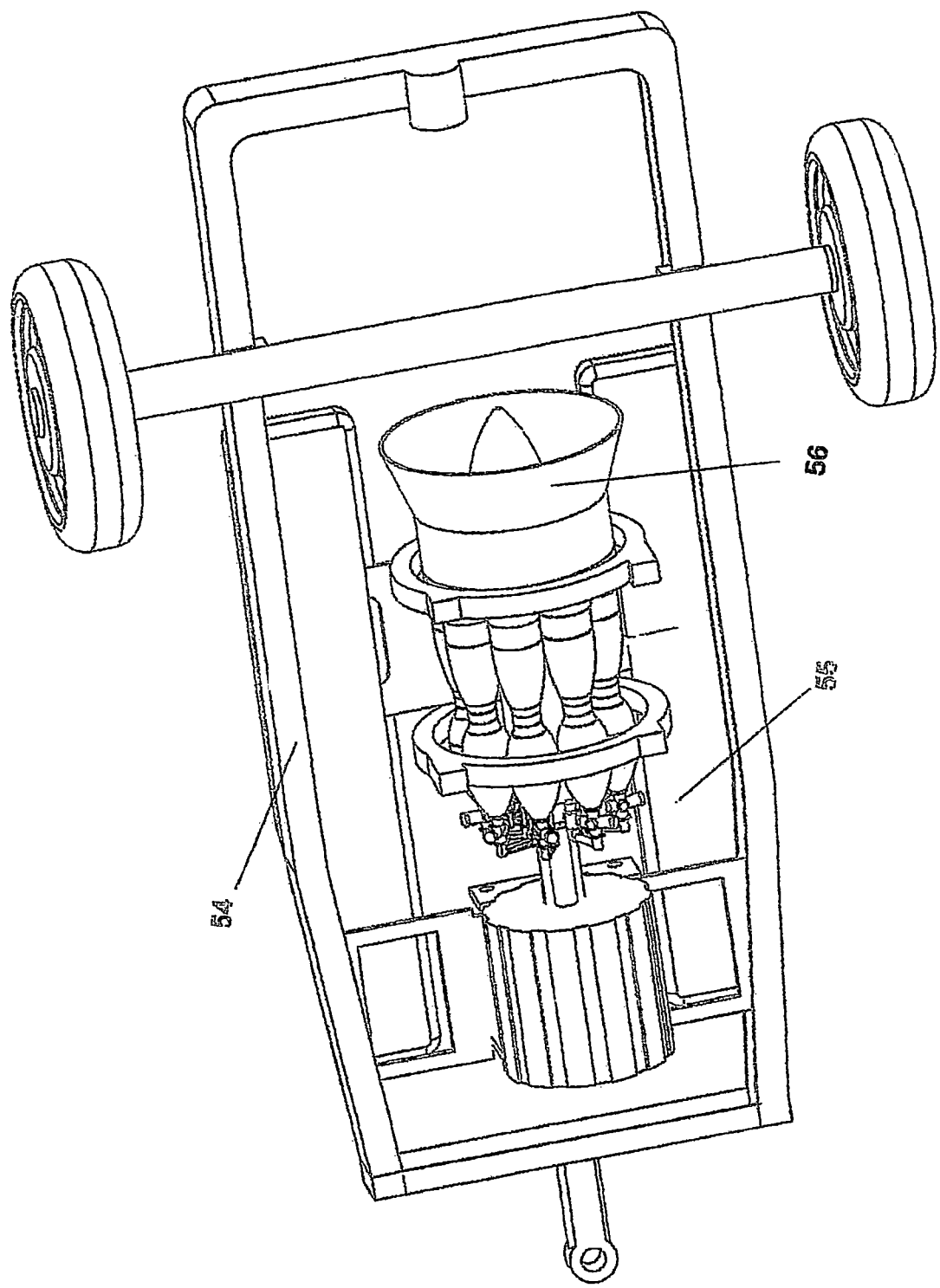
FIG. 2C presents the side view of an Electronically speed controlled pulsed supersonic turbine engine

FIG. 2 and FIG. 2A present a top and a front view respectively of an electronic speed controlled pulsed supersonic turbine engine 56 for electric power for electrical energy generation energized by clean renewable energy from an extremely high-pressure air stored in mobile air-tank 12 with outlet shaft 11 coupled with electrical power generator input shaft 52, with outlet shaft speed control using electronically controlled pulse generator controller 43 creating short time pulses that actuate sequentially fast opening solenoid valves 14 in the predetermined amplitude, sequence and time duration.

Figure 3:
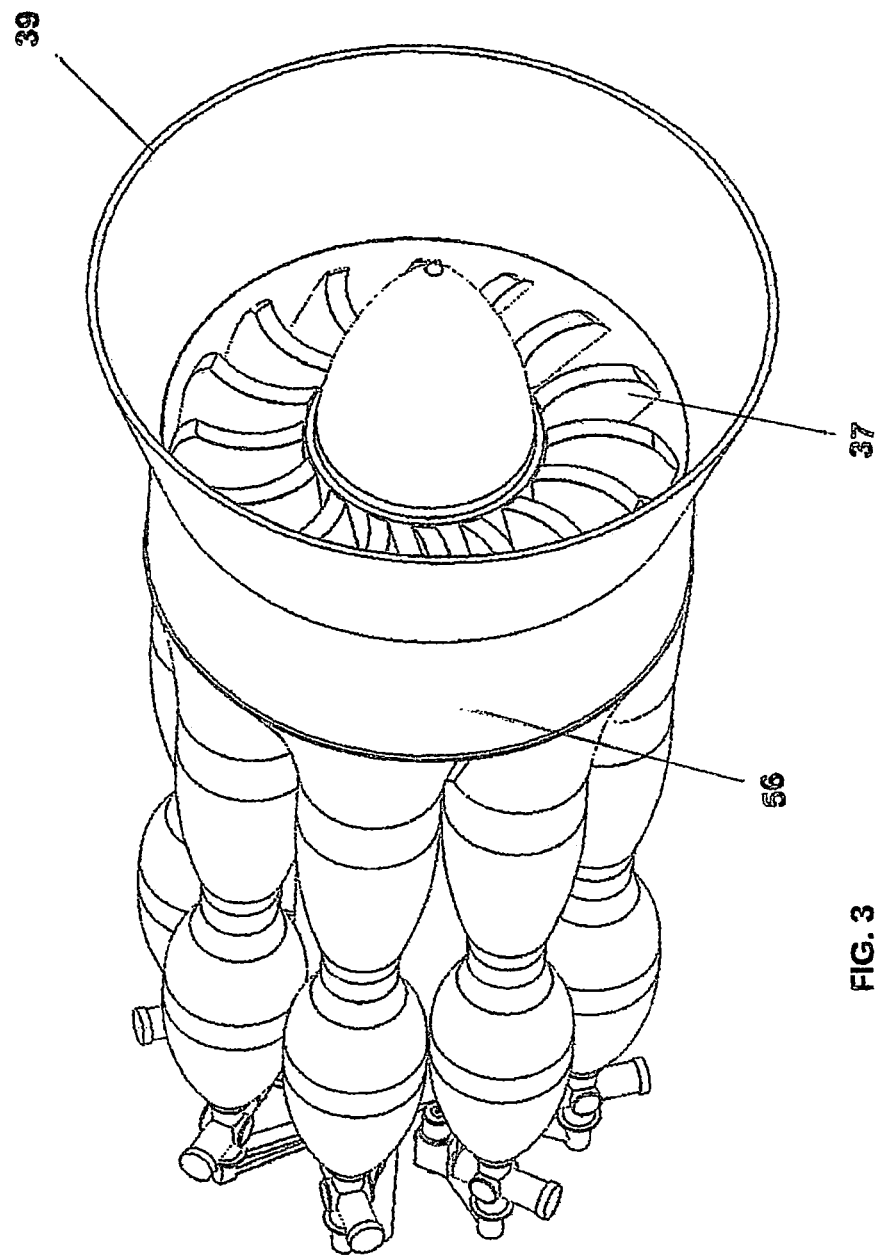
FIG. 3 presents the air tank of high-pressure air

FIG. 3 presents a large internal air-tank 12 storing large amounts of extremely high-pressure air, with through center-hole 12c, supporting an output shaft 11, and extended to support turbine rotating inner shroud with turbine bearings 48.

Figure 4:
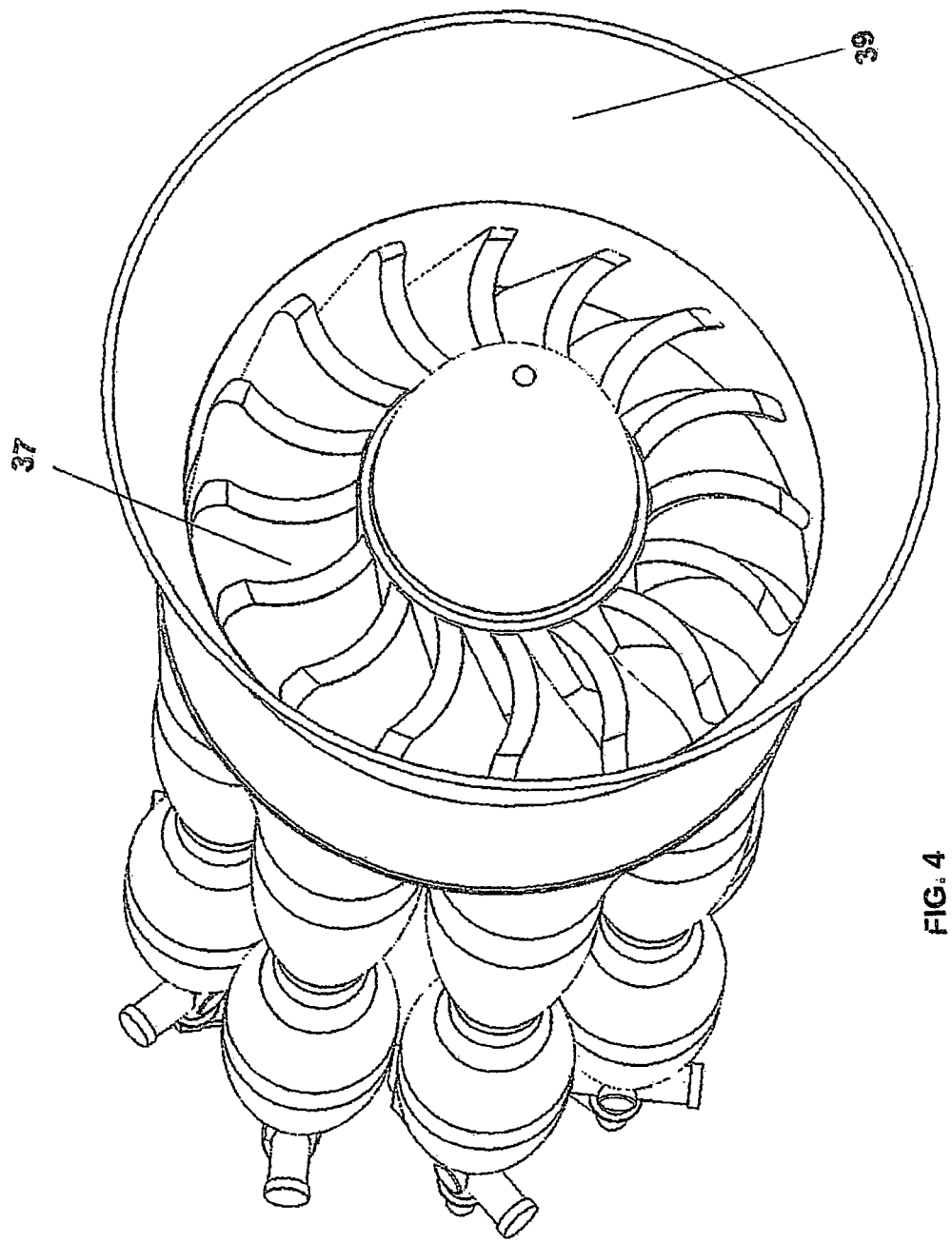
FIG. 4 presents the engine output shaft rotating within said center hole with magnet ring

FIG. 4 presents an engine output shaft rotating within said center hole with magnets embedded in non-magnet ring 45, supported to said air-tank with two ball bearings 13 one at each end, thereby supporting said rotating engine output shaft 11 and sensing its rotating speed.

Figure 5:
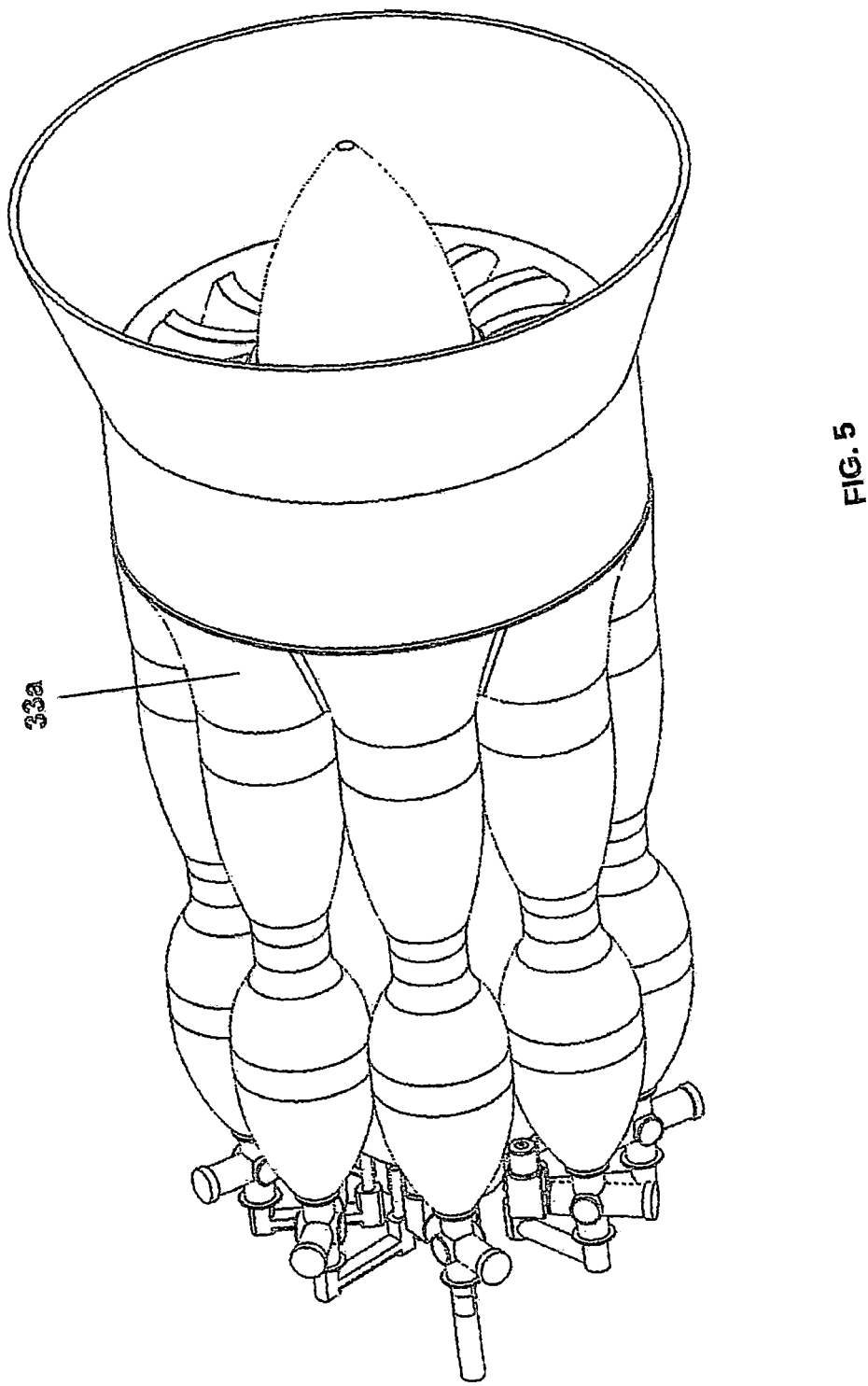
FIG. 5 presents the air-tank relief valve of the air tank

FIG. 5 presents an air-tank relief valve 12d to prevent air overpressure in said extremely high-pressure air tank 12.

Figure 6:
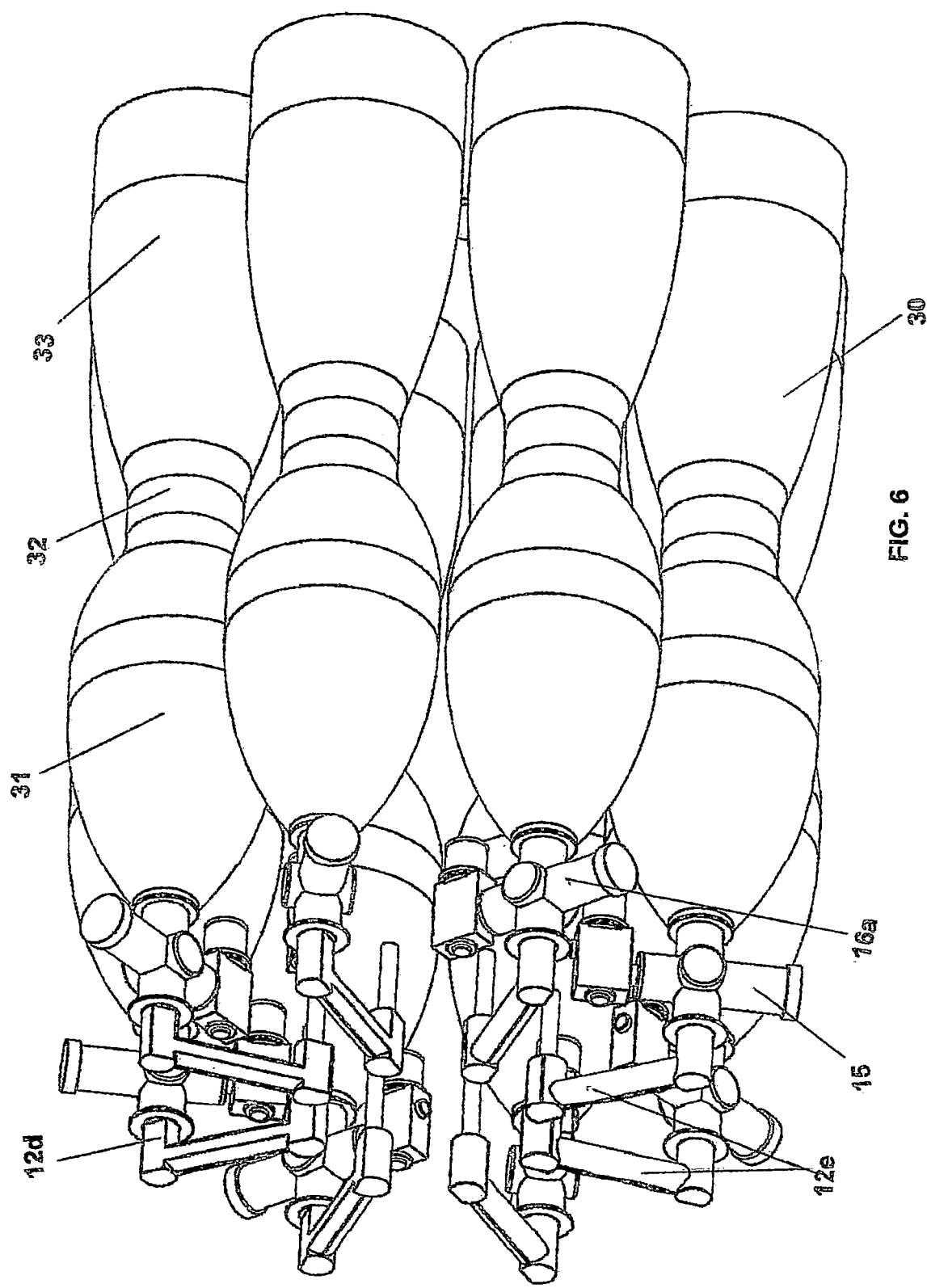
FIG. 6 presents the air-tank front end flange bolted automotive structural chassis

FIG. 6 presents an air-tank front-end flange 12a bolted to said automotive structural chassis 53 or said electric power generator chassis 54, thereby supporting the engine to the chassis.

Figure 7:
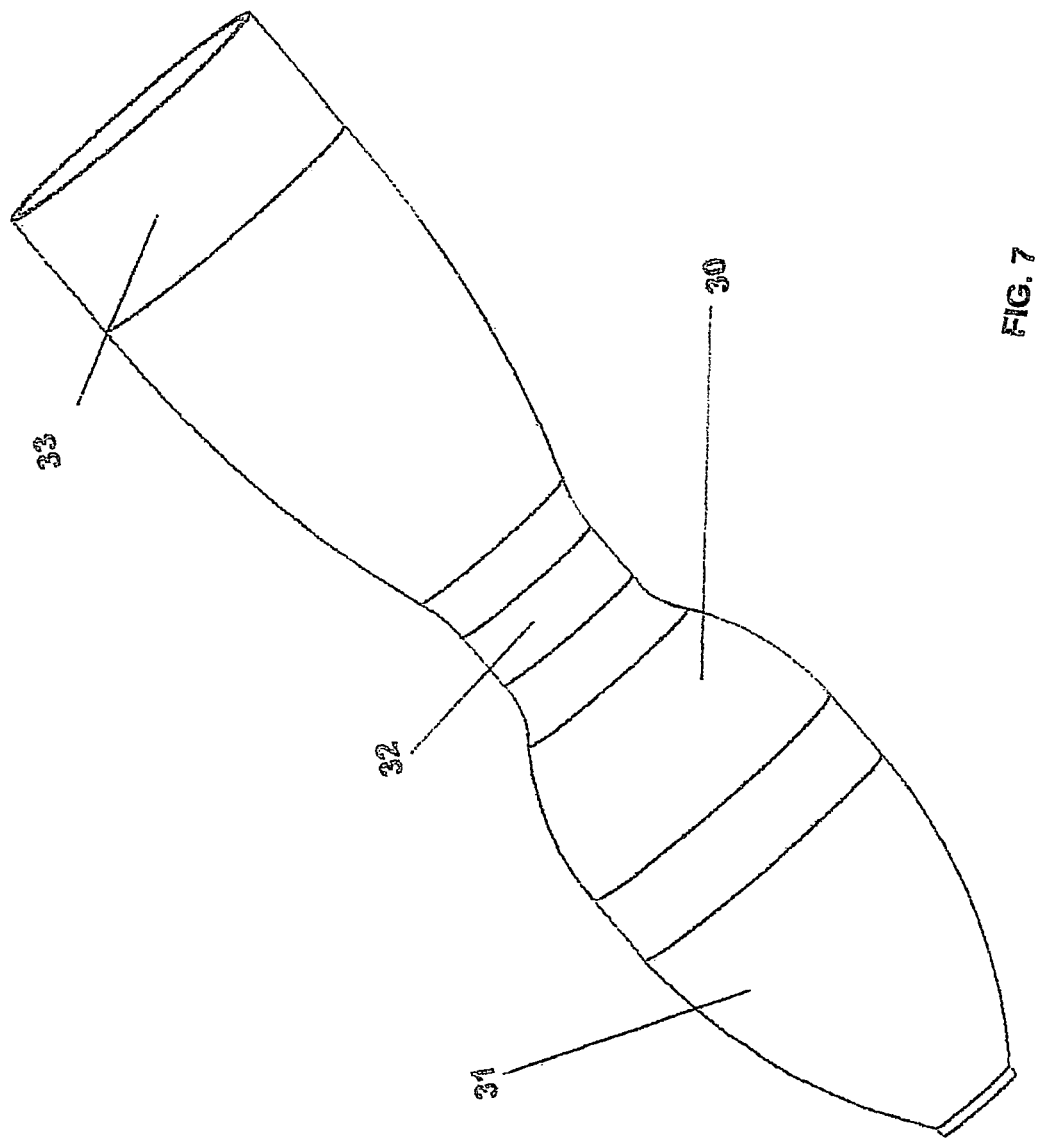
FIG. 7 presents an air-tank Inlet port with a high-pressure gas shutoff valve.

FIG. 7 presents an air-tank Inlet port 12e with a high-pressure gas shutoff valve, thereby controlling the charging of the air-tank with extremely high-pressure air from auxiliary high-capacity external air-tank 55.

Figure 8:
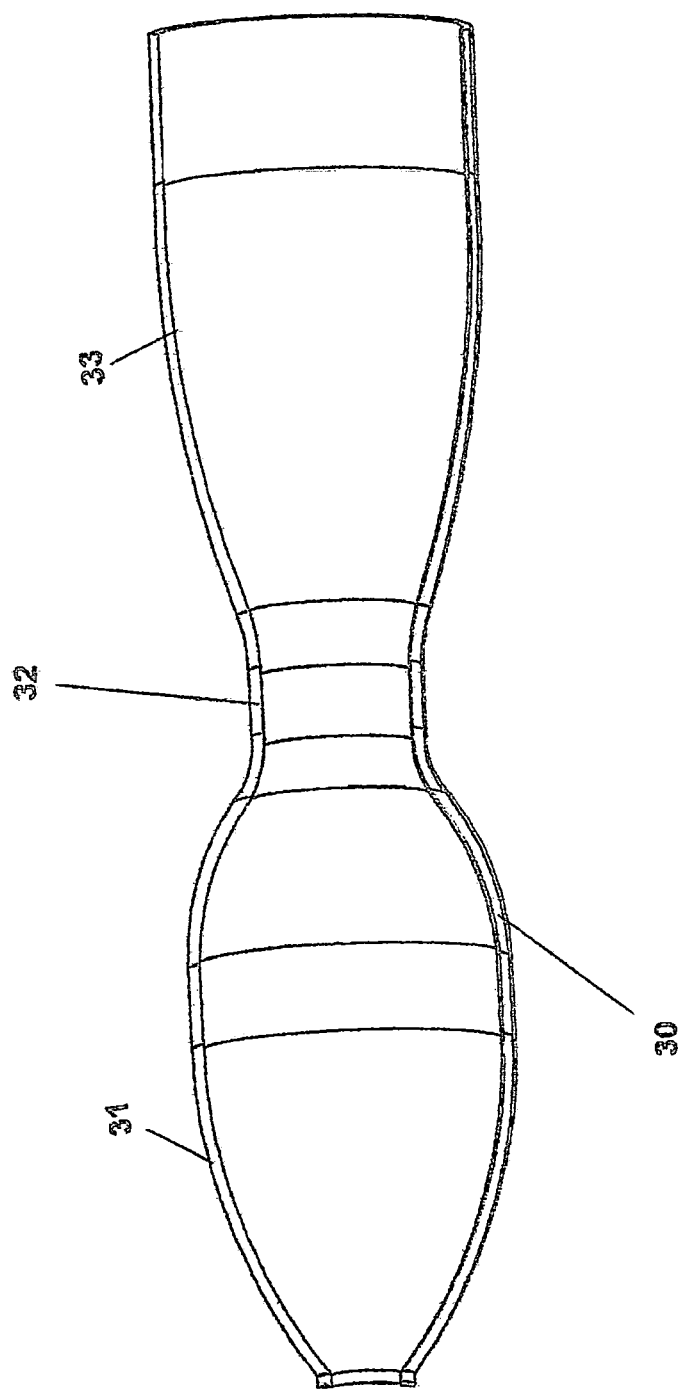
FIG. 8 presents eight air-tank outlet ports connected to eight control solenoid valves
Figure 9:
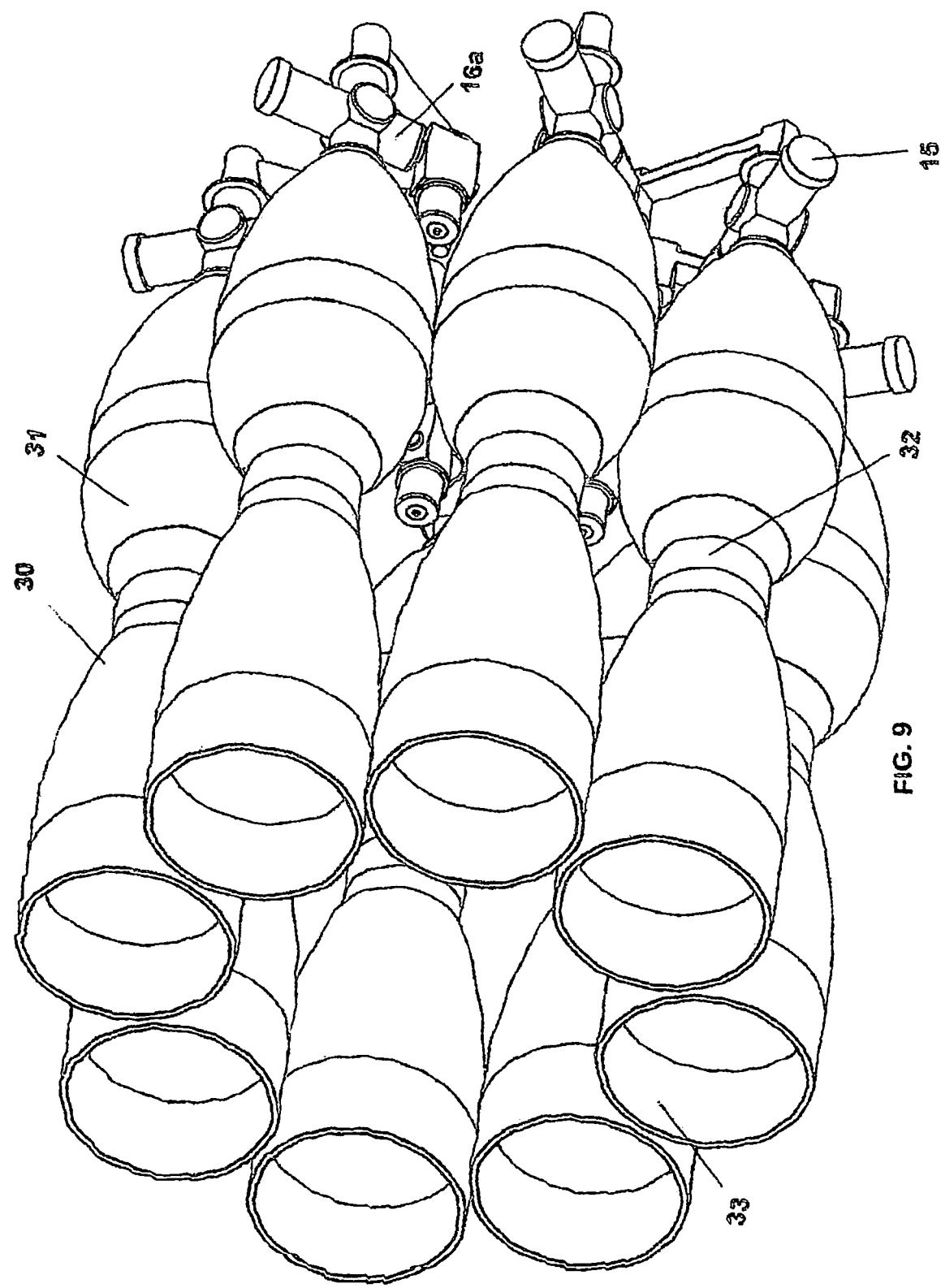
FIG. 9 presents two turbine ball bearings mounted on the inner shroud

FIG. 8 presents eight air-tank outlet relief valves 12d and air-tank connecting pipe 12e connected to eight control solenoid valves 14 operated by electrical voltage pulse of controlled time duration, voltage, and sequence FIG. 9 presents two turbine ball bearings 48 mounted on the inner shroud 34 with outer diameter supported by said air-tank center hole 12c.

Figure 10:
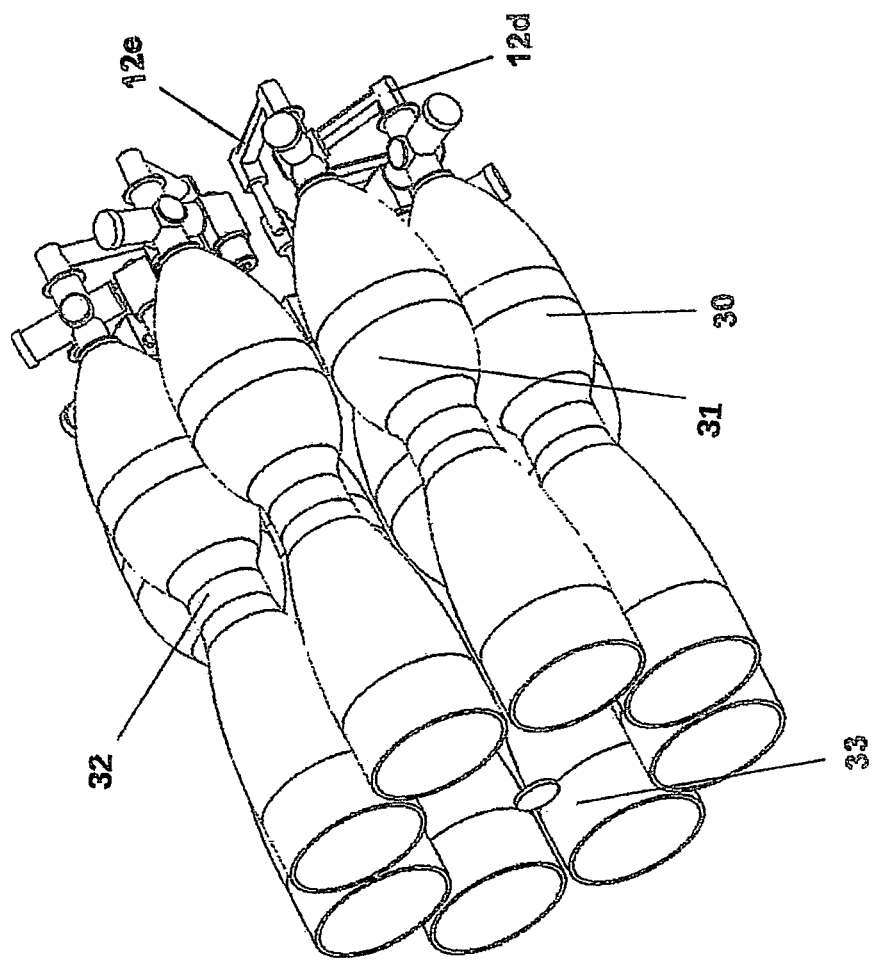
FIG. 10 presents an air-tank front flange supporting a magnetic speed sensor

FIG. 10 presents an air-tank front flange 12a supporting a magnetic speed sensor 46 thereby sensing magnet signal from the magnet ring attached to said output shaft 11.

Figure 11:
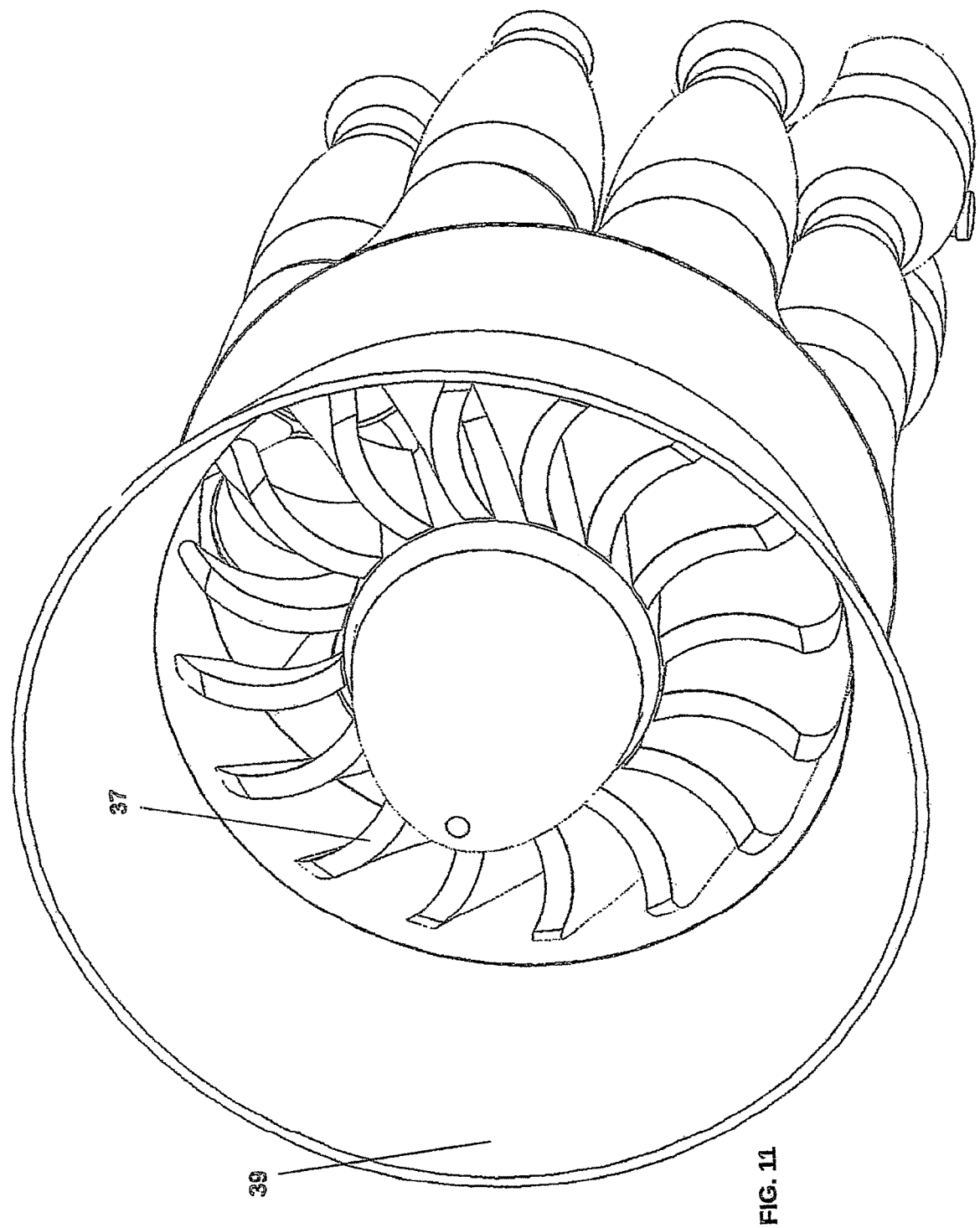
FIG. 11 presents eight supersonic airflow convergent-divergent manifolds each equipped with flow control solenoid valve

FIG. 11 presents eight supersonic airflow convergent-divergent manifolds 30 each equipped with flow control solenoid valve 14 and spool valve inlet port 18 connected to said high-pressure tank air connecting pipe 12e.

Figure 12:
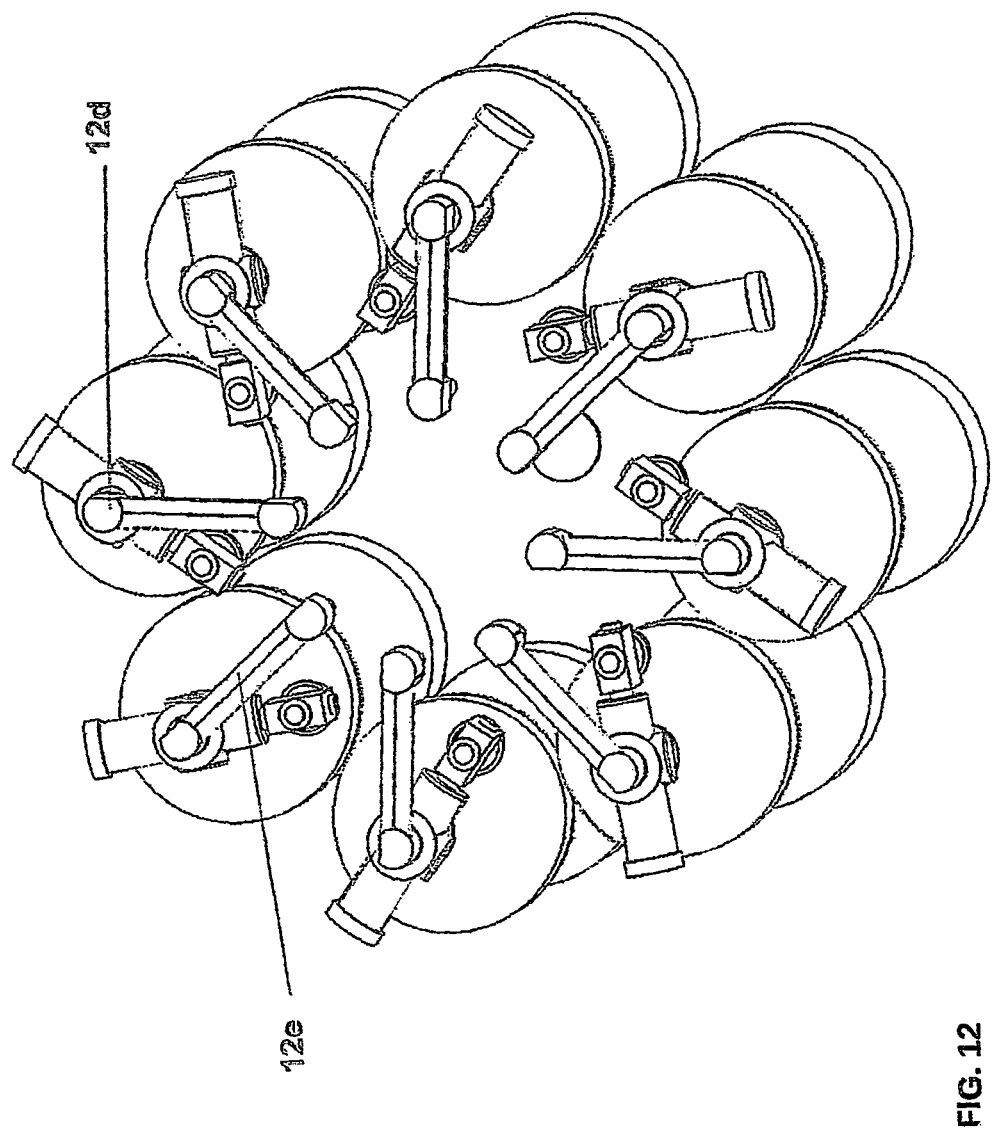
FIG. 12 presents a high-pressure gas flow inlet convergent manifold chamber

FIG. 12 presents a high-pressure gas flow inlet convergent manifold chamber 31 of high-pressure with subsonic airflow speed funneled into a choked flow nozzle 32 with the sonic flow and then divergent manifold chamber 33 with supersonic airflow.

Figure 13:
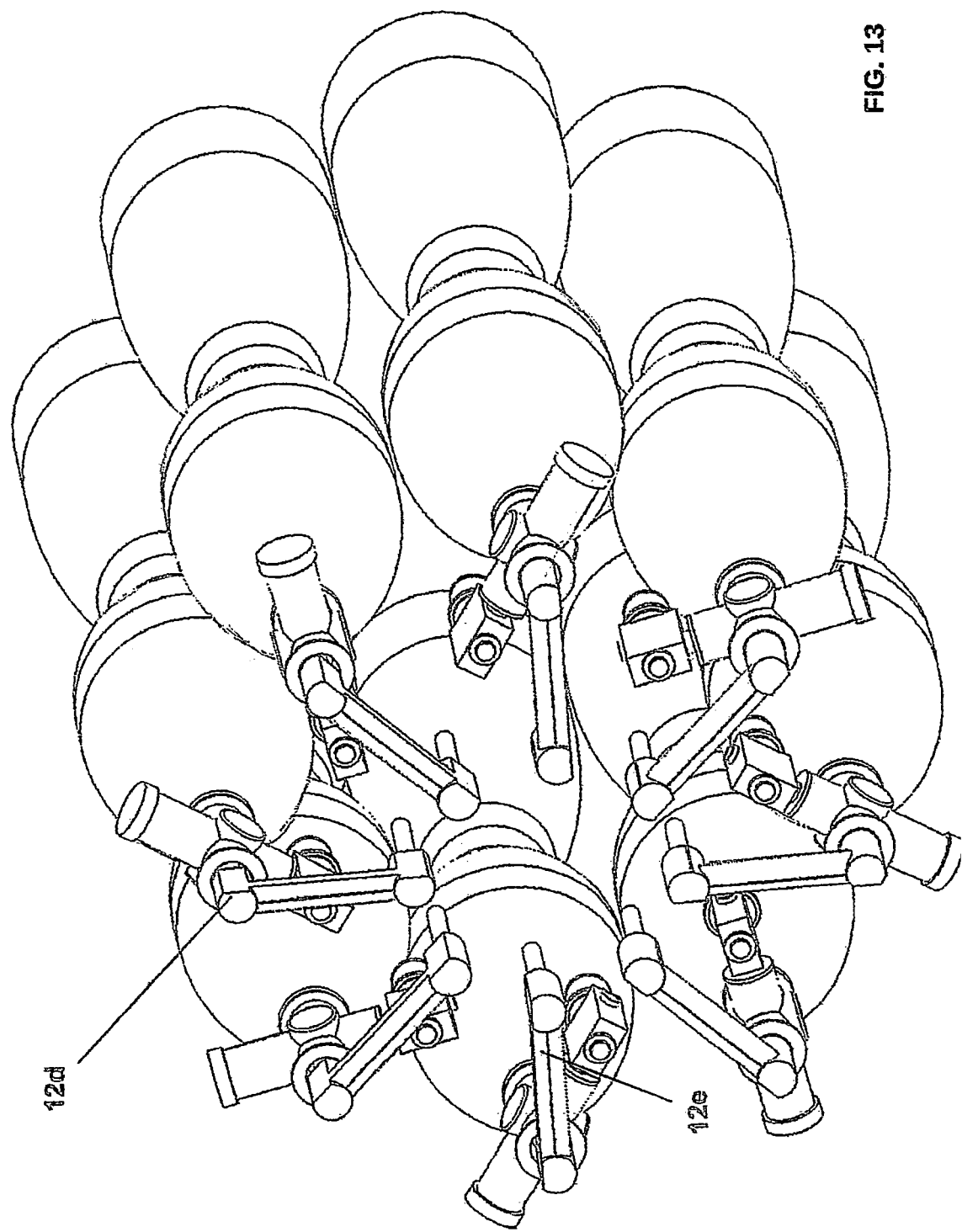
FIG. 13 presents a fast-opening pulse energized solenoid valve

FIG. 13 presents a fast-opening pulse energized solenoid valve 14 with solenoid valve inlet port 28 connected to said air-tank outlet port 12e, controlling extremely high-pressure gas flow into the spool valve command inlet port 21.

Figure 14:
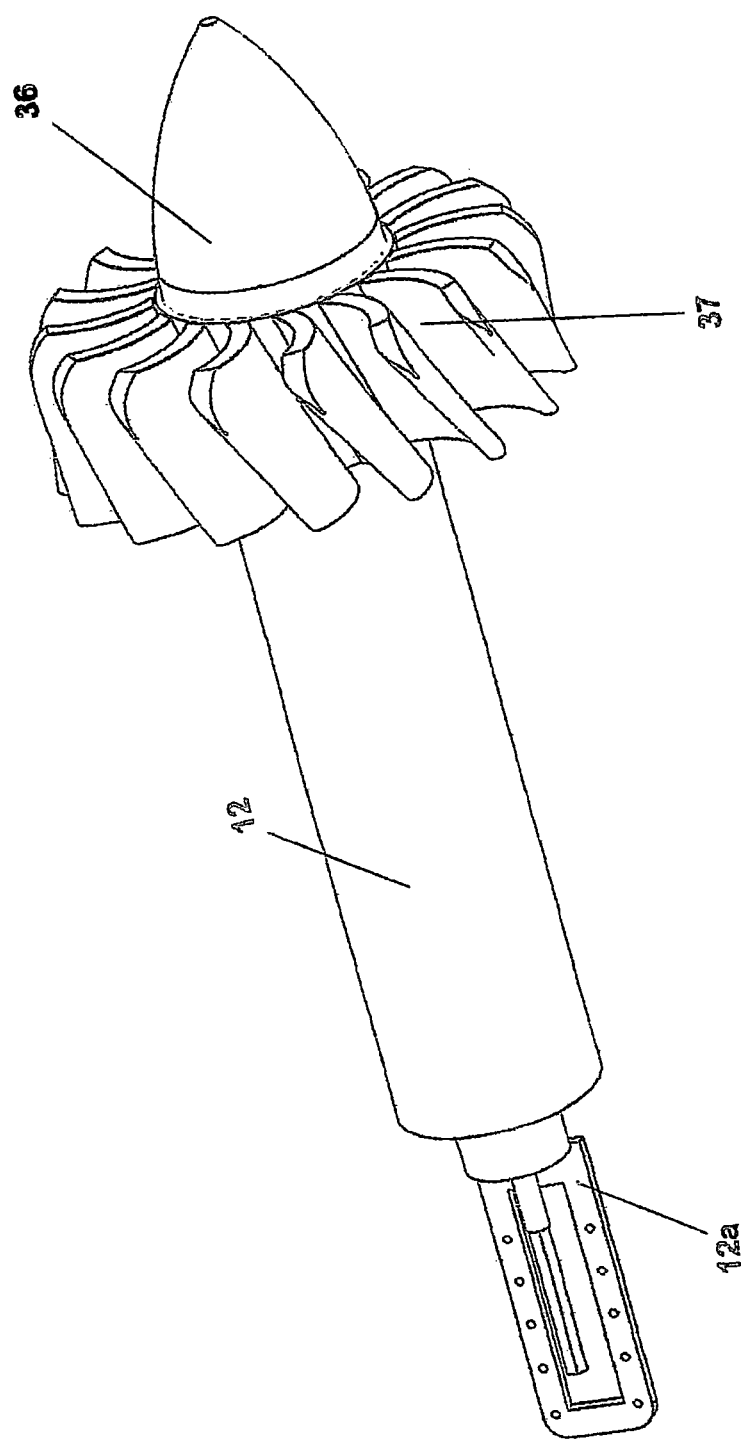
FIG. 14 presents a fast-opening solenoid coil energized by short duration voltage pulses from an electronic pulse generator

FIG. 14 presents a fast-opening solenoid coil 23 energized by short-duration voltage pulses from an electronic pulse generator 43 thereby opening the said valve for a very short time flow to spool valve inlet port 18.

Figure 15:
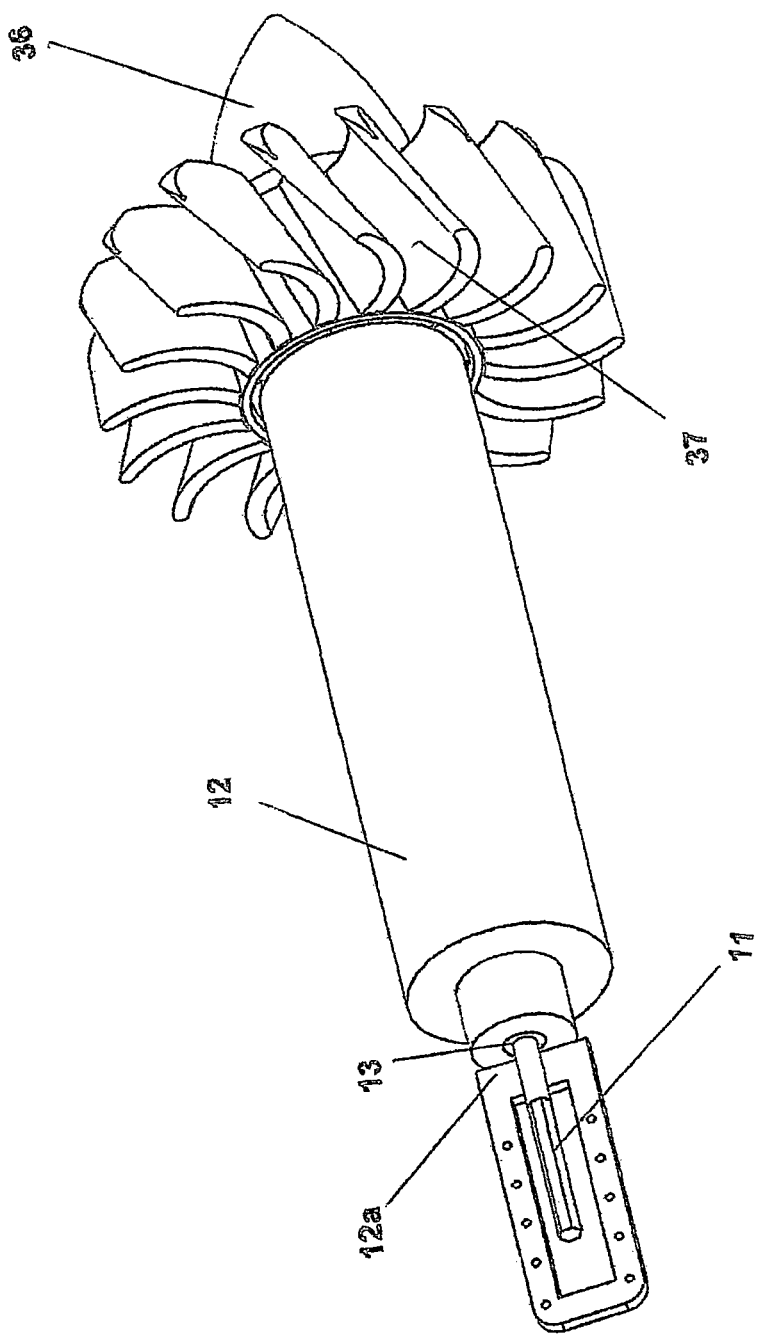
FIG. 15 presents a pressure-balanced solenoid valve plunger

FIG. 15 presents a pressure-balanced solenoid valve plunger 25 with a conical poppet sealing surface, thereby providing a tight seal against solenoid valve seal seat 27 at balanced forces condition.

Figure 16:
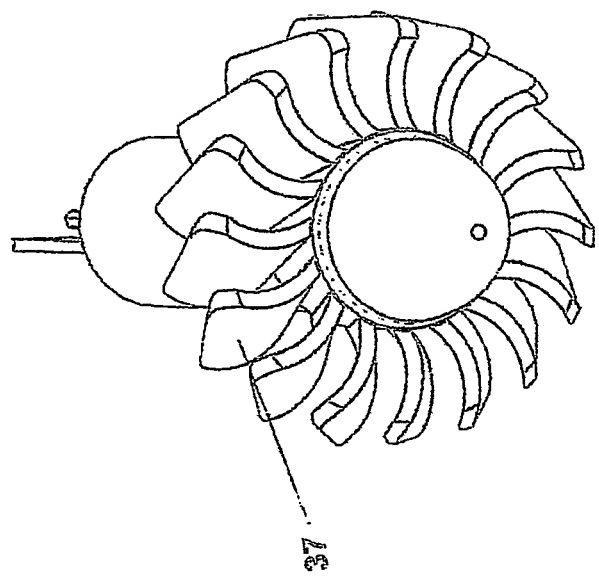
FIG. 16 presents a solenoid valve body with a solenoid valve air inlet port

FIG. 16 presents a solenoid valve body 24 with a solenoid valve air inlet port 28 connected to said tank air connecting pipe 12d, an outlet port connected to the pilot valve inlet port, a solenoid support flange, a radial seal seat 27, and a solenoid valve electrical connector 23a said solenoid valve plunger 16 with a center-hole and with radial seal rings, whereas said plunger poppet 25a creates a tight seal when engages said ring seal and is pushed by solenoid armature 25b under electrical pulse, moving away from engagement with said seal seat 27, allowing full-airflow to the spool valve command inlet port 21.

Figure 17:
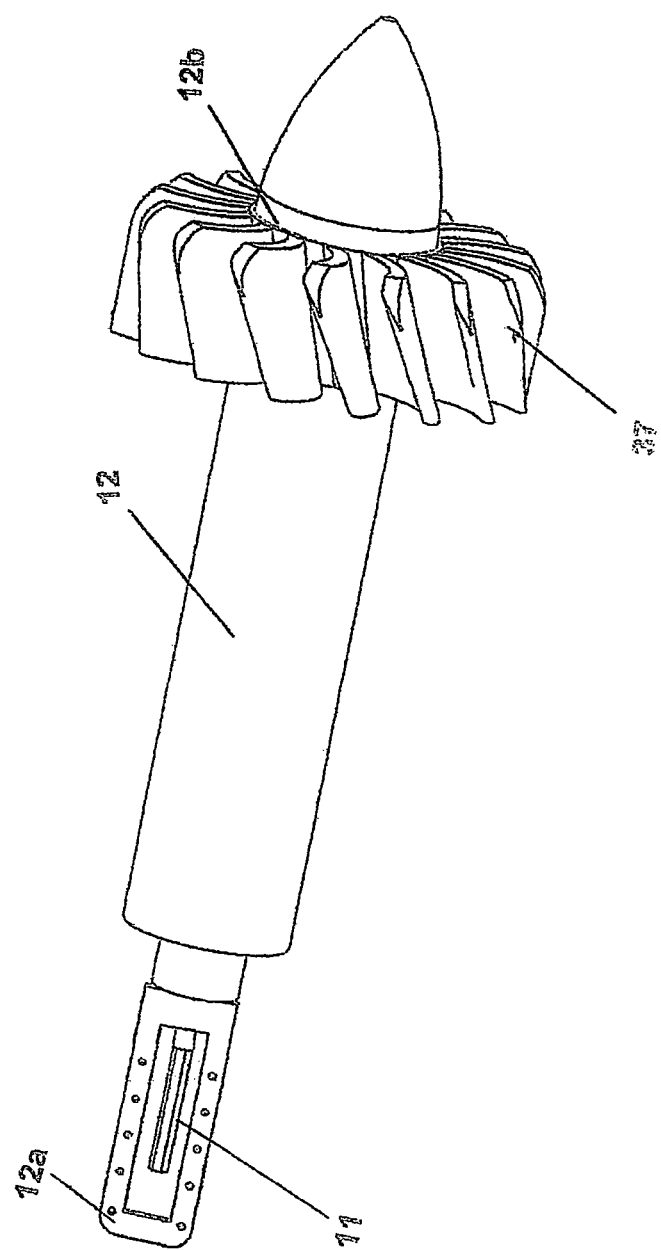
FIG. 17 presents a helical spring pushing the solenoid valve plunger

FIG. 17 presents a helical spring 26 pushing said pressure-balanced plunger 25 to move to the solenoid valve no-airflow sealed position, thereby keeping the valve at the no-airflow sealed position when the solenoid is not energized.

Figure 18:
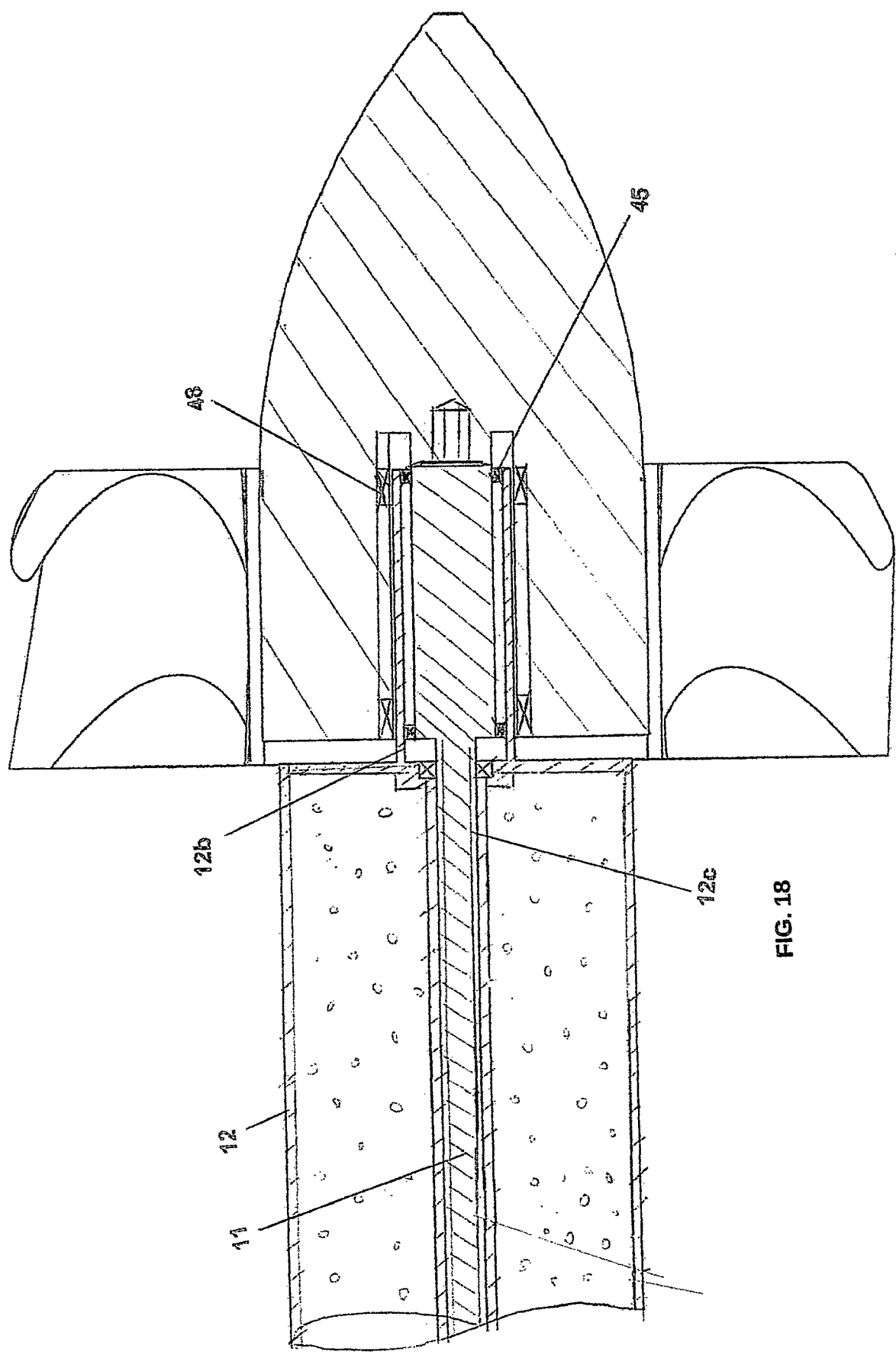
FIG. 18 presents a solenoid valve inlet port with an air-tank connecting pipe.

FIG. 18 presents a solenoid valve inlet port 28 with an air-tank connecting pipe 12e and air-tank shutoff valve 41 and air-tank relief valve 12d connected to air tank 12.

Figure 19:
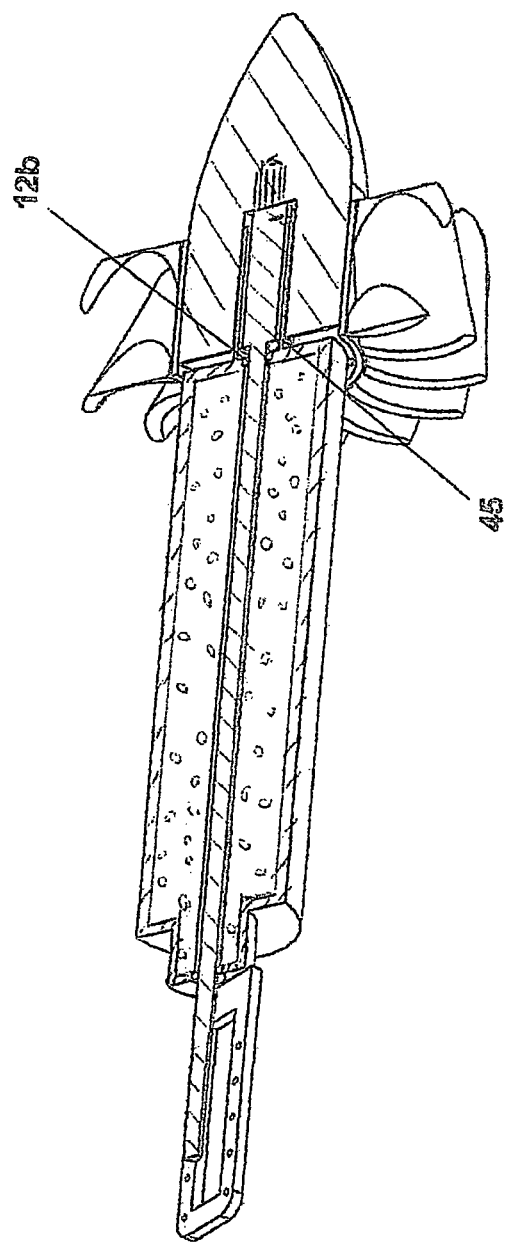
FIG. 19 presents a solenoid valve outlet port connected to the spool valve

FIG. 19 presents a solenoid valve outlet port 29 connected to said spool valve command inlet port 21 thereby actuating said spool valve cylindrical spool 16 by pushing the spool to full-airflow position.

Figure 20:
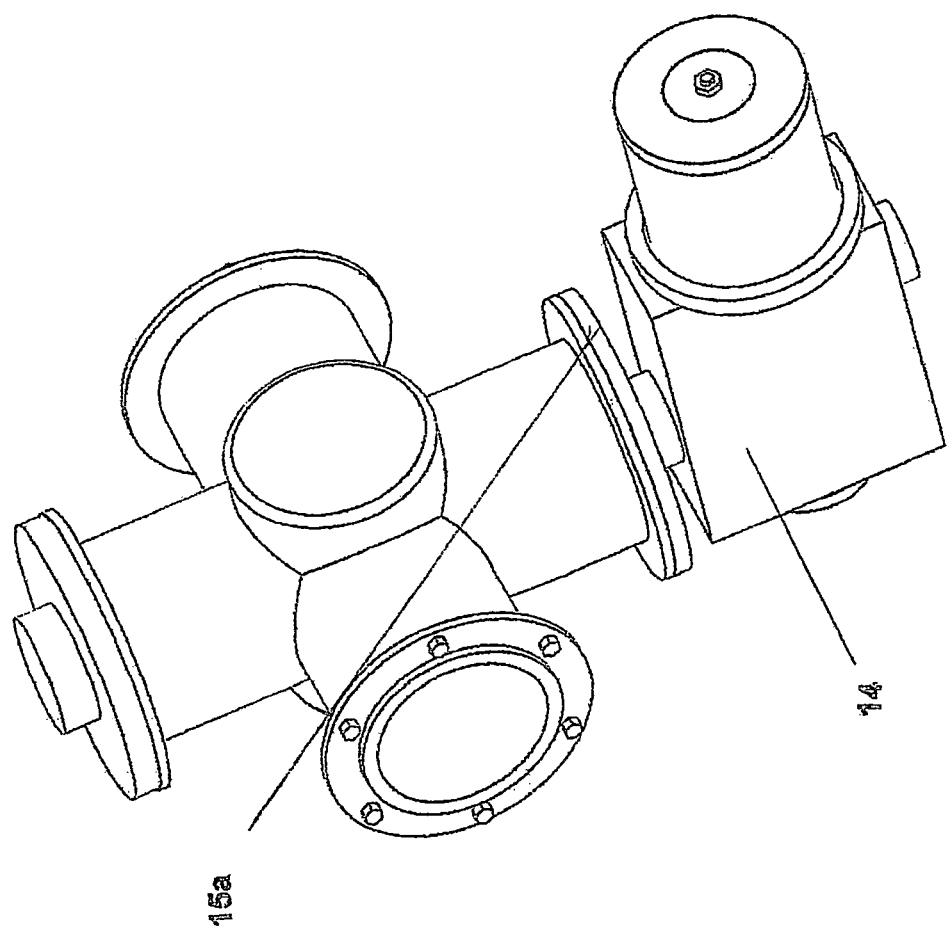
FIG. 20 presents a pressure-commanded spool valve

FIG. 20 presents a pressure-commanded spool valve 15 connecting extremely high-pressure gas from said air tank connecting pipe 12d into said convergence manifold chamber 31.

Figure 21:
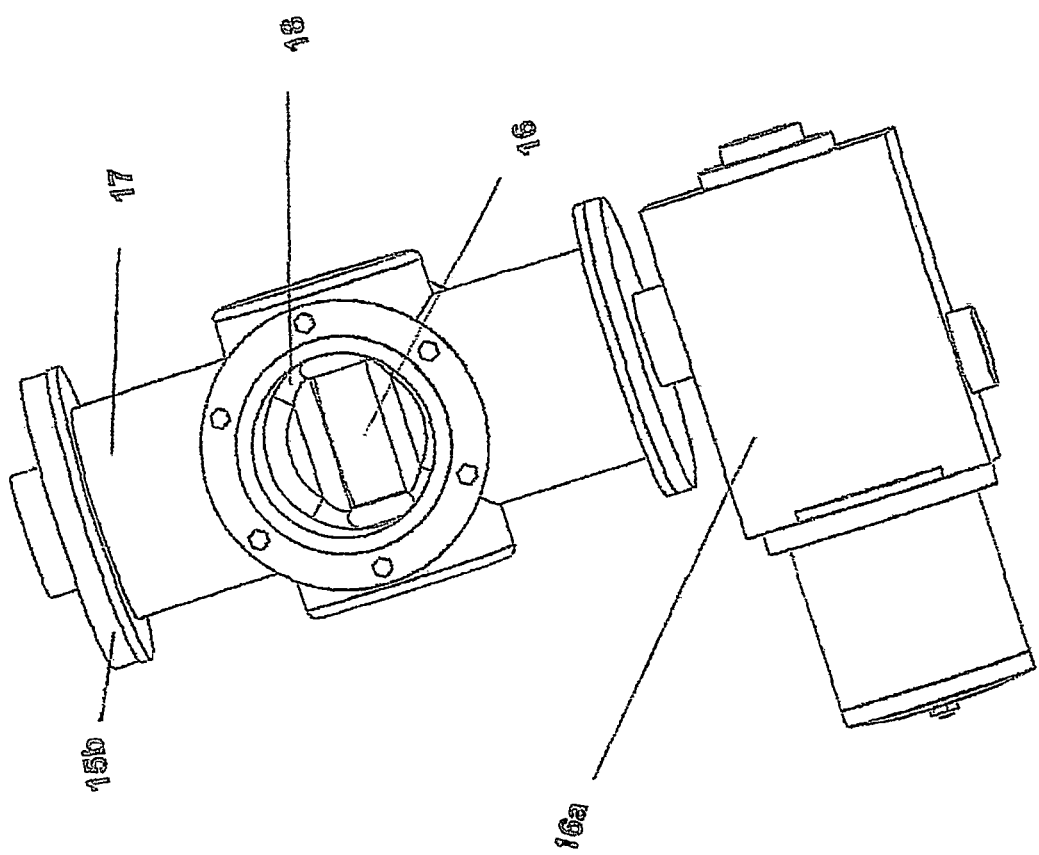
FIG. 21 presents a spool valve body with a spool valve bore

FIG. 21 presents a spool valve body 24 with a spool valve bore 17a, with a spool valve spring cover 15b and with a spool valve command port cover 15a, whereas the bottom cover supporting a spool valve return spring 22 pushing the spool to sealed no flow position and said spool valve bore 17a is pressurized under spool valve top cover 15a pushing spool valve cylindrical spool 16 to full airflow position.

Figure 22:
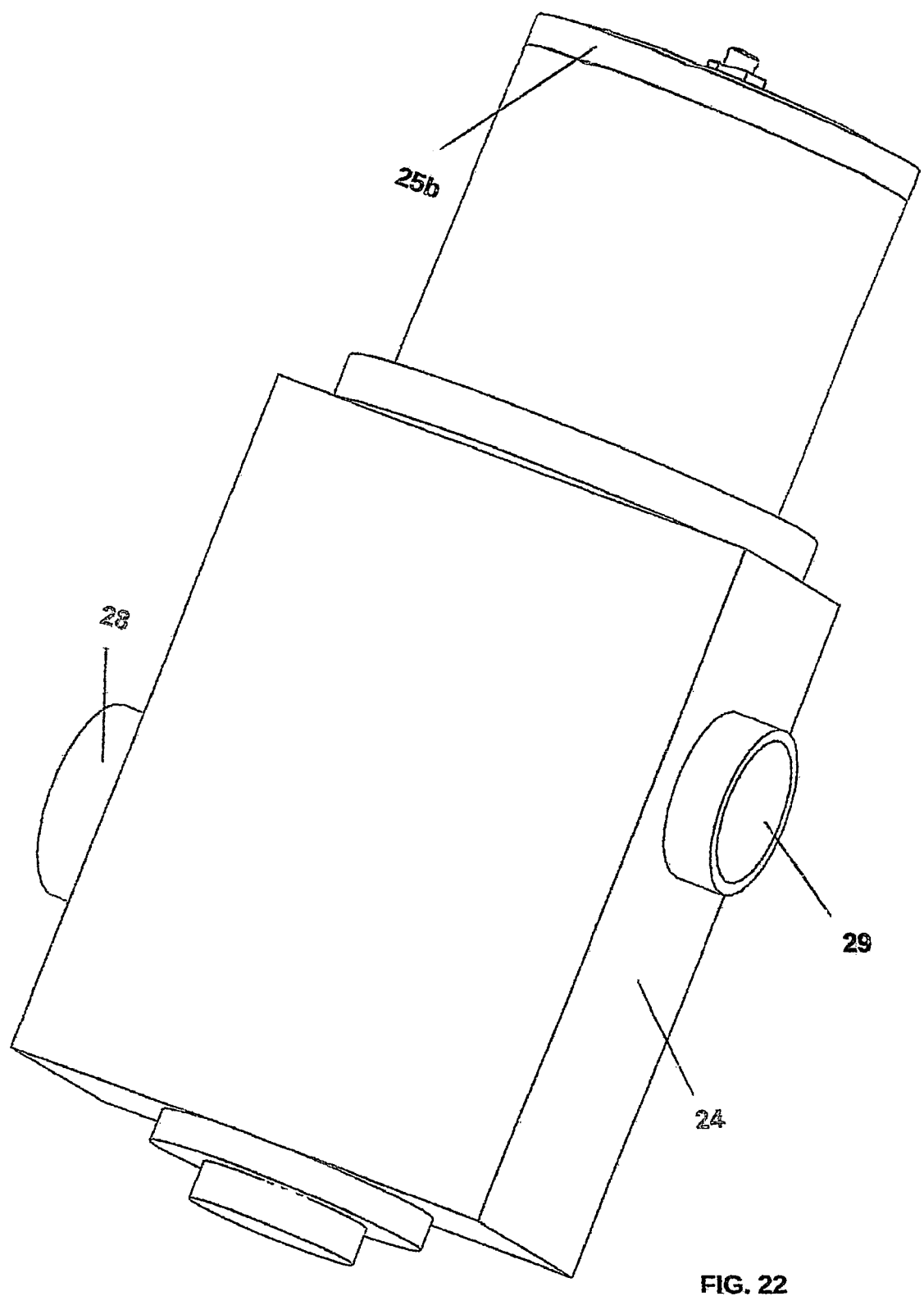
FIG. 22 presents a spool valve cylindrical spool with a cylindrical spool lateral circular through hole

FIG. 22 presents a spool valve cylindrical spool 16 with a cylindrical spool lateral circular through hole 16a in its center, wherein the spool valve cylindrical spool is sliding axially inside the spool valve spool bore 17a to open full airflow position under the command of a pulsed pressurized air from the solenoid valve outlet port 19 into the spool valve bore 17a under the spool valve top cover 15a.

Figure 23:
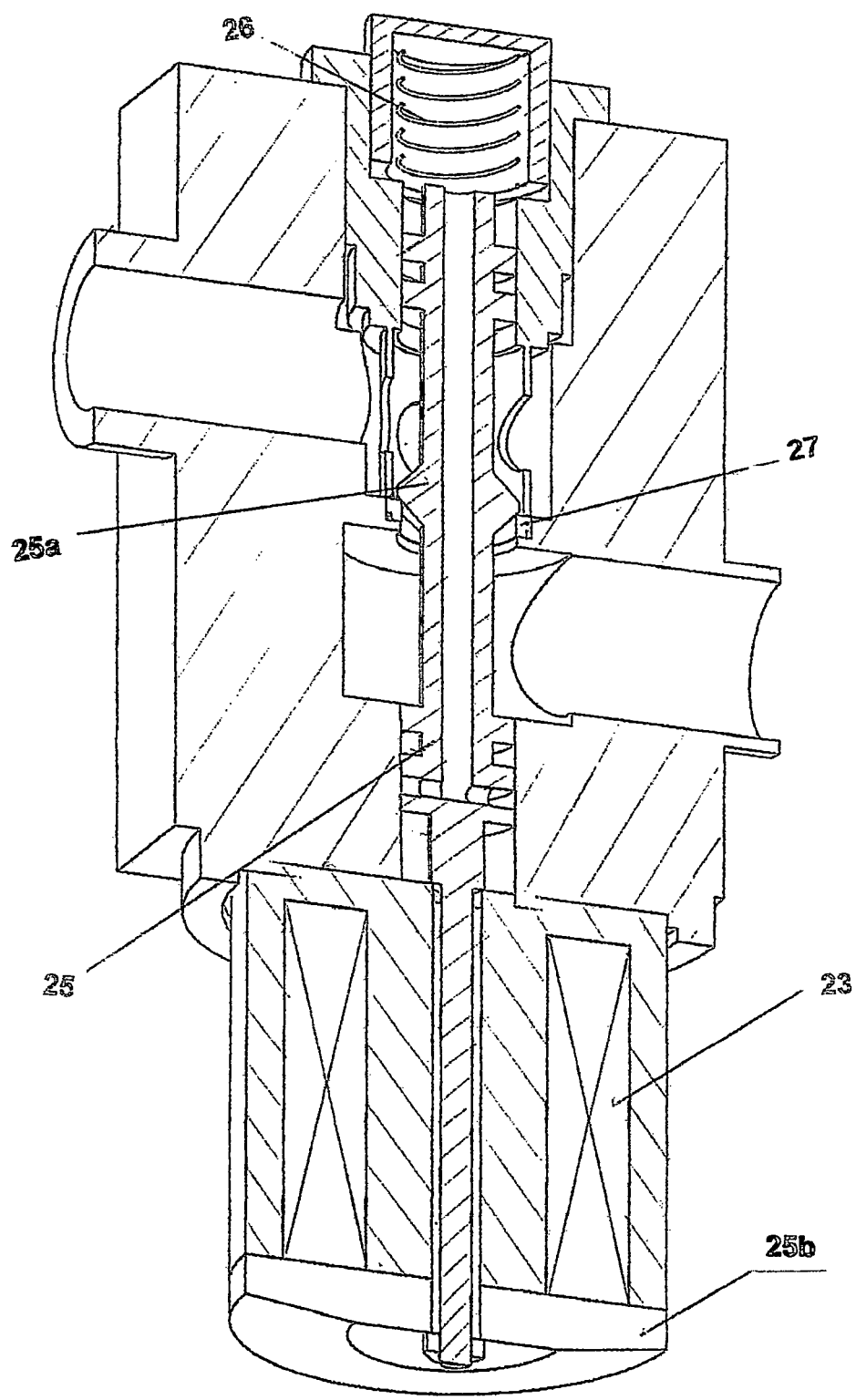
FIG. 23 presents a spool valve helical return spring between the spool valve cylindrical spool and spool valve bottom cover

FIG. 23 presents a spool valve helical return spring 22 between the spool valve cylindrical spool 16 and spool valve bottom cover 15b, thereby said spring applying axial force on the cylindrical spool, pushing it back to sealed-no airflow position.

Figure 24:
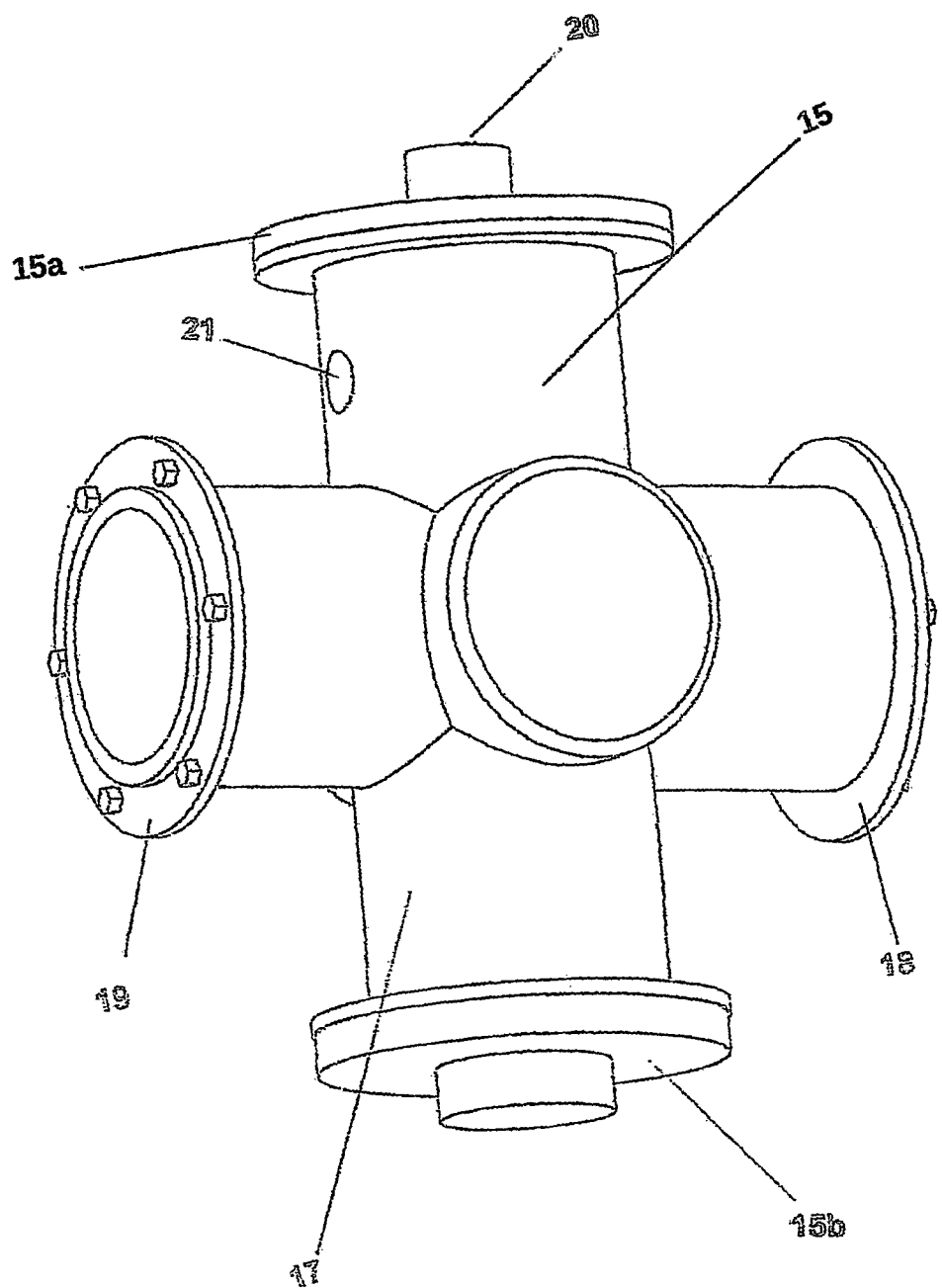
FIG. 24 presents the spool valve inlet command port connected to the spool valve bore

FIG. 24 presents the spool valve inlet command port 20 connected into the spool valve bore 17a top side connected to the solenoid valve outlet port 29, thereby applying a fast short duration pressurized air pulse axially on the top side of said spool valve cylindrical spool 16 causing a rapid movement to the full-airflow position.

Figure 25:
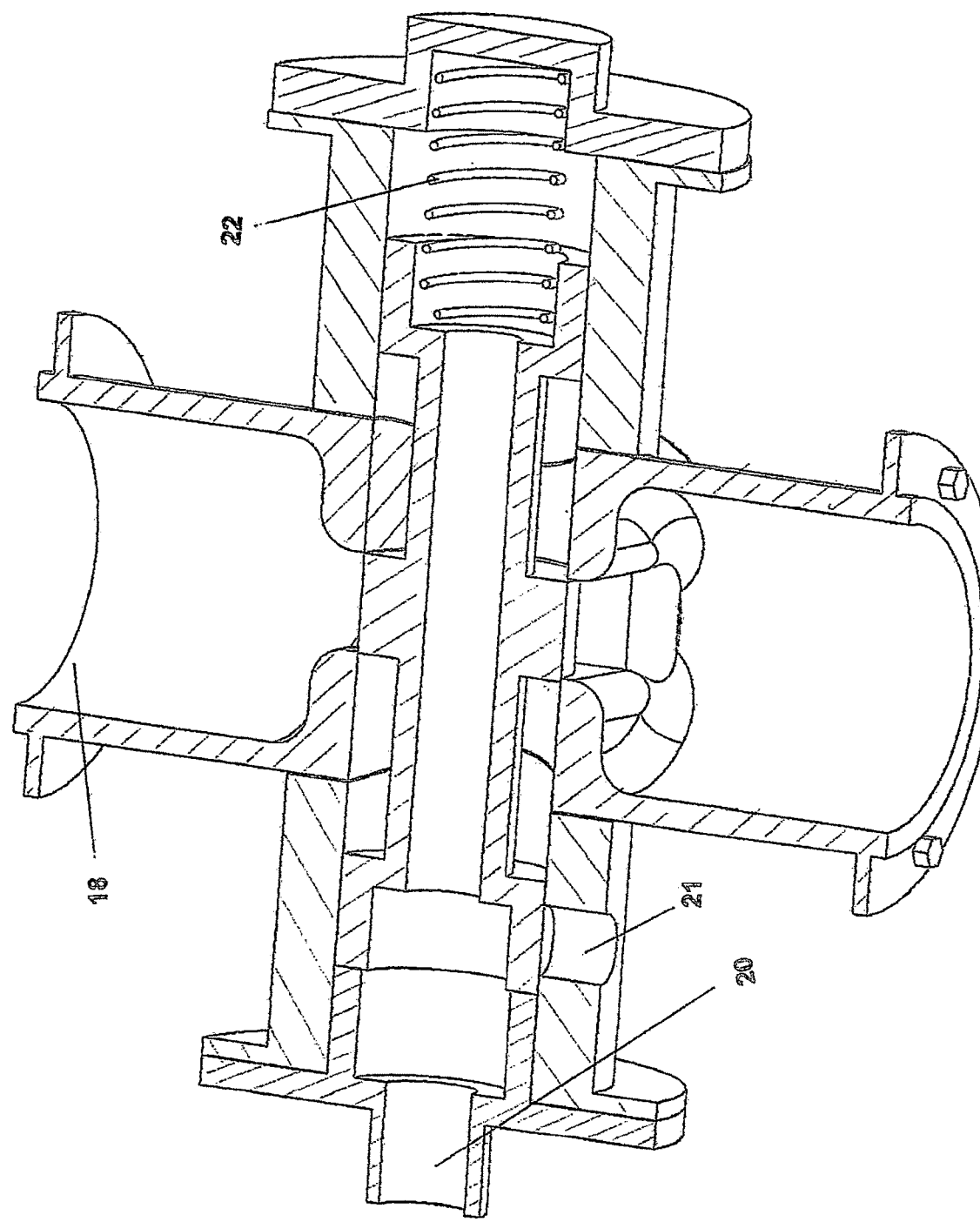
FIG. 25 presents the spool valve inlet airflow port connected to the air tank outlet port

FIG. 25 presents the spool valve inlet airflow port 18 connected to the air tank outlet port 12f at spool valve 15 full-airflow through the spool valve circular spool lateral through hole 16a to convergence manifold chamber 31.

Figure 26:
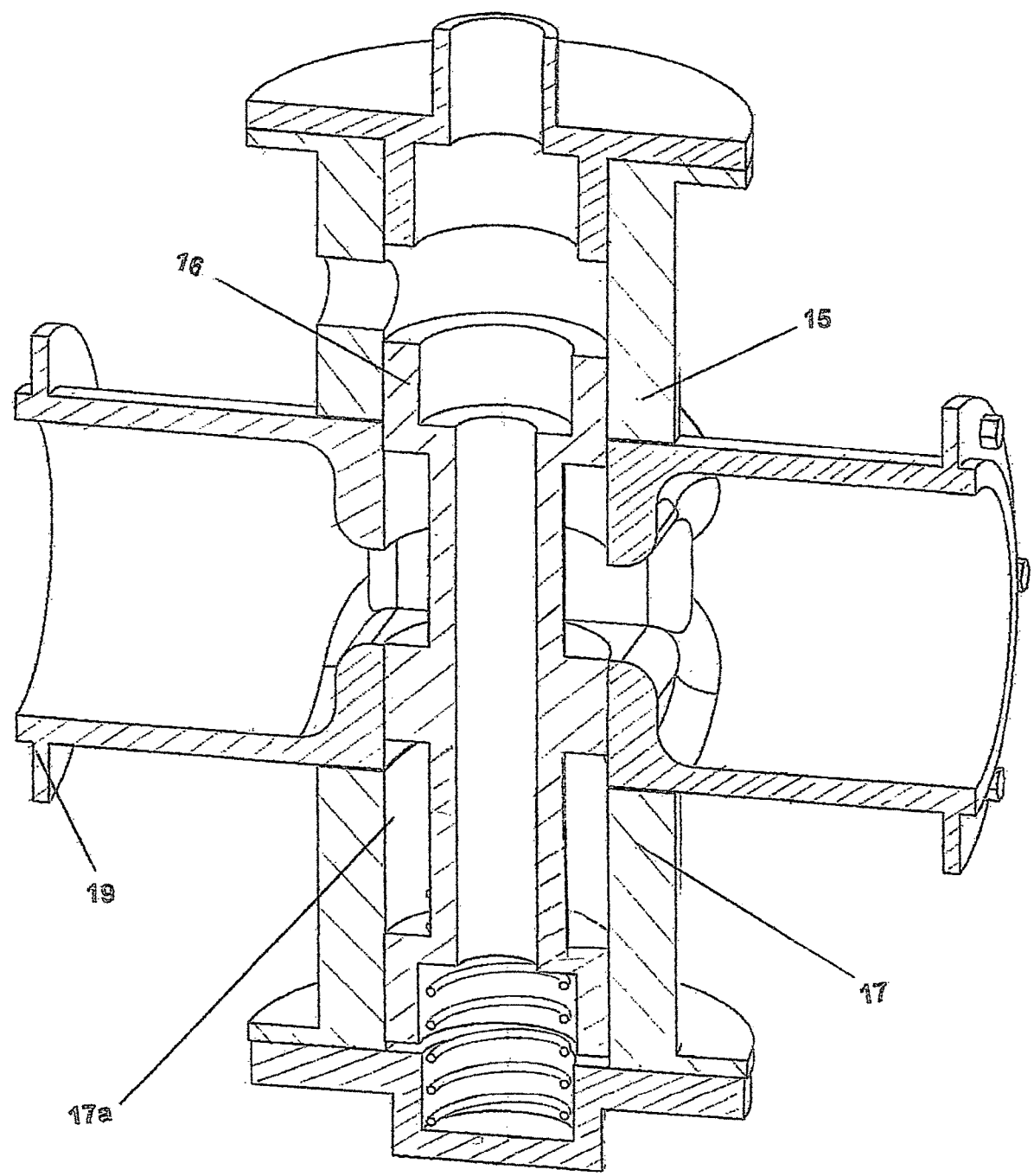
FIG. 26 presents the spool valve outlet port connected to the convergence manifold chamber

FIG. 26 presents the spool valve outlet port 19 connected to the convergence manifold chamber 31. When the spool valve is in full-airflow position, the high-pressure airflow at subsonic speed flows into convergence manifold chamber 31.

Figure 27:
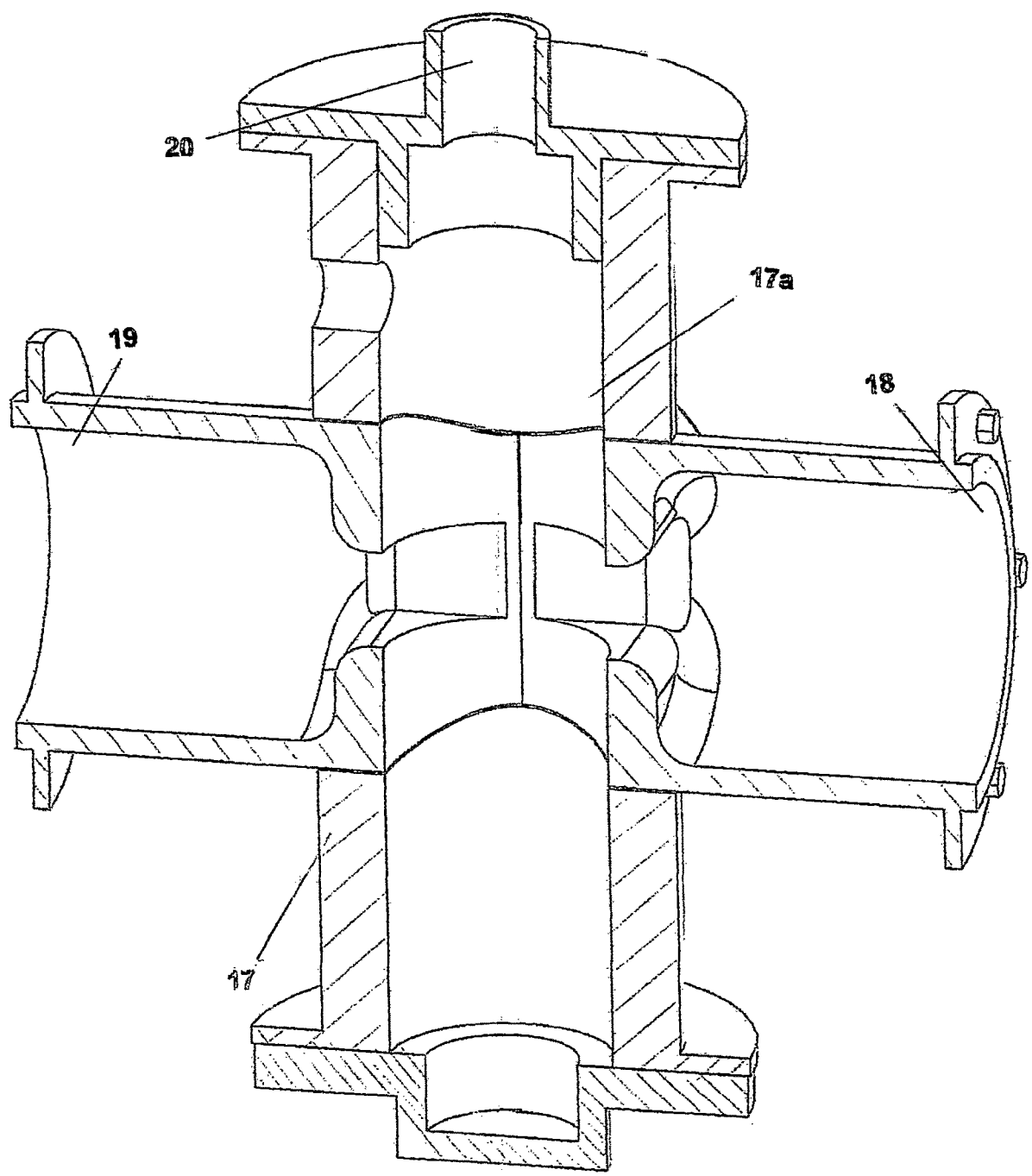
FIG. 27 presents the convergence manifold chamber connected to the spool valve outlet port

FIG. 27 presents the convergence manifold chamber 31 connected to the spool valve outlet port 19. The Subsonic airflow in the convergence manifold chamber is funneled into a choking nozzle 32 sonic airflows.

Figure 28:
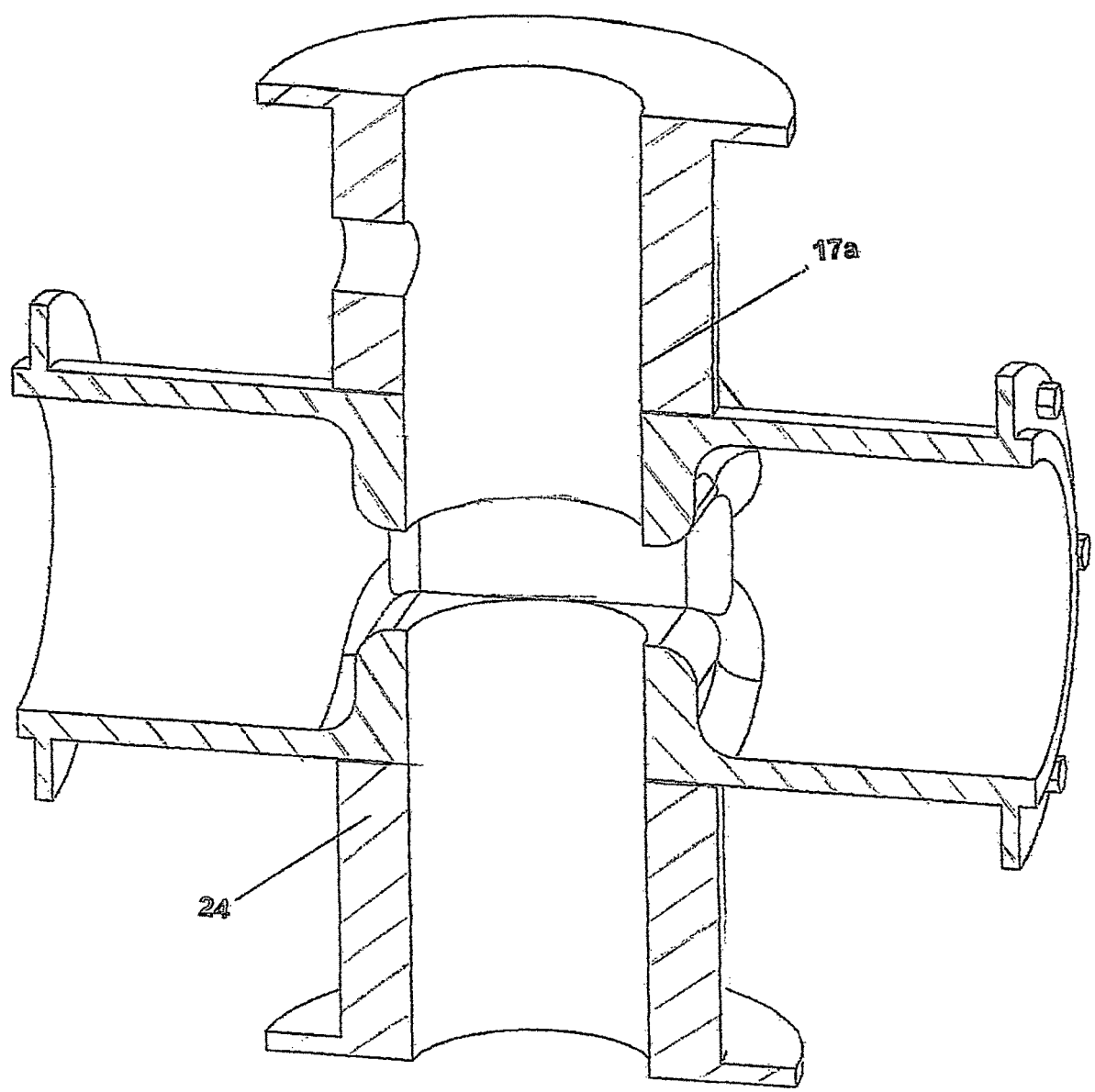
FIG. 28 presents a choked sonic airflow in the choking nozzle

FIG. 28 presents a choked sonic airflow in the choking nozzle 32 through a controlled precision tapered diameter where airflow speed is kept at the speed of sound. The airflow is then accelerated into a larger diameter divergence manifold chamber 33.

Figure 29:
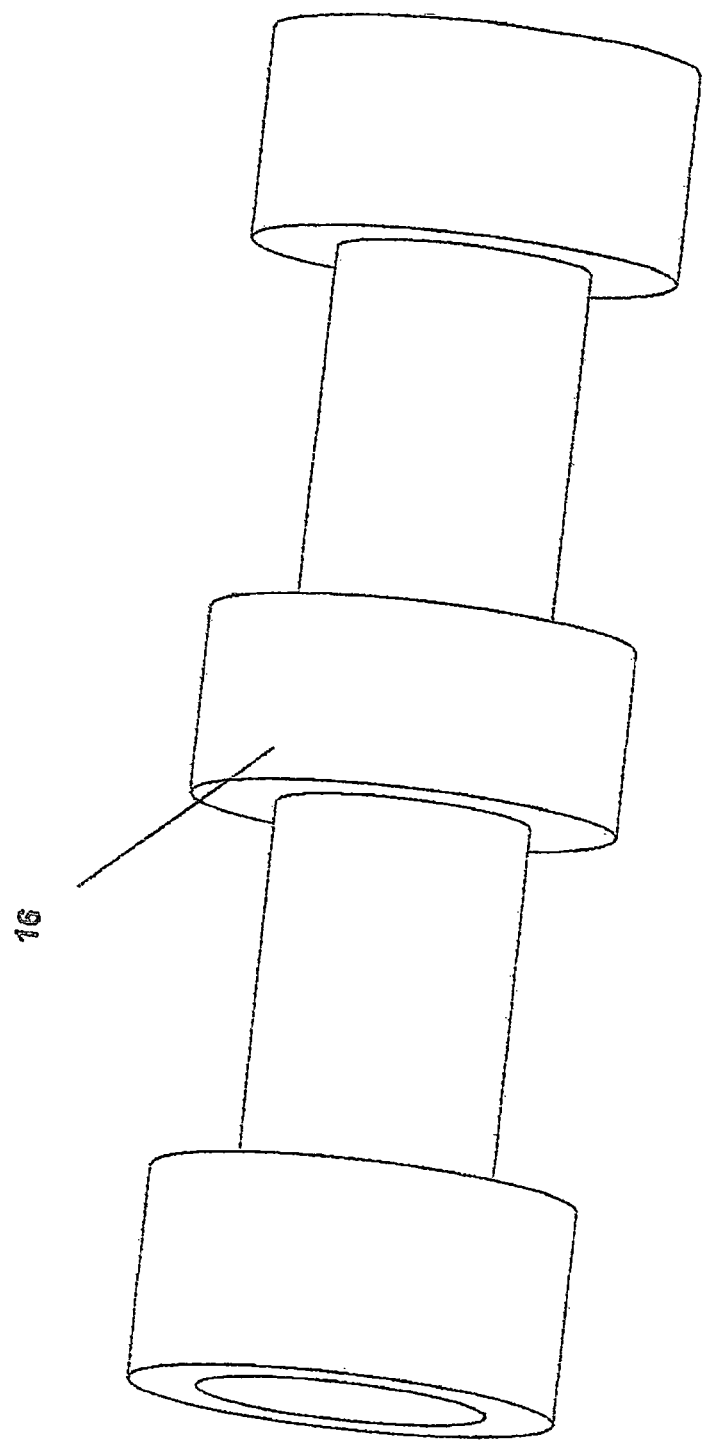
FIG. 29 presents the divergence manifold chamber

FIG. 29 presents the divergence manifold chamber 33 where airflow speed increases to supersonic with a Mach number larger than 1, while being limited to M=1.2 to avoid the creation of a lateral shock wave.

Figure 30:
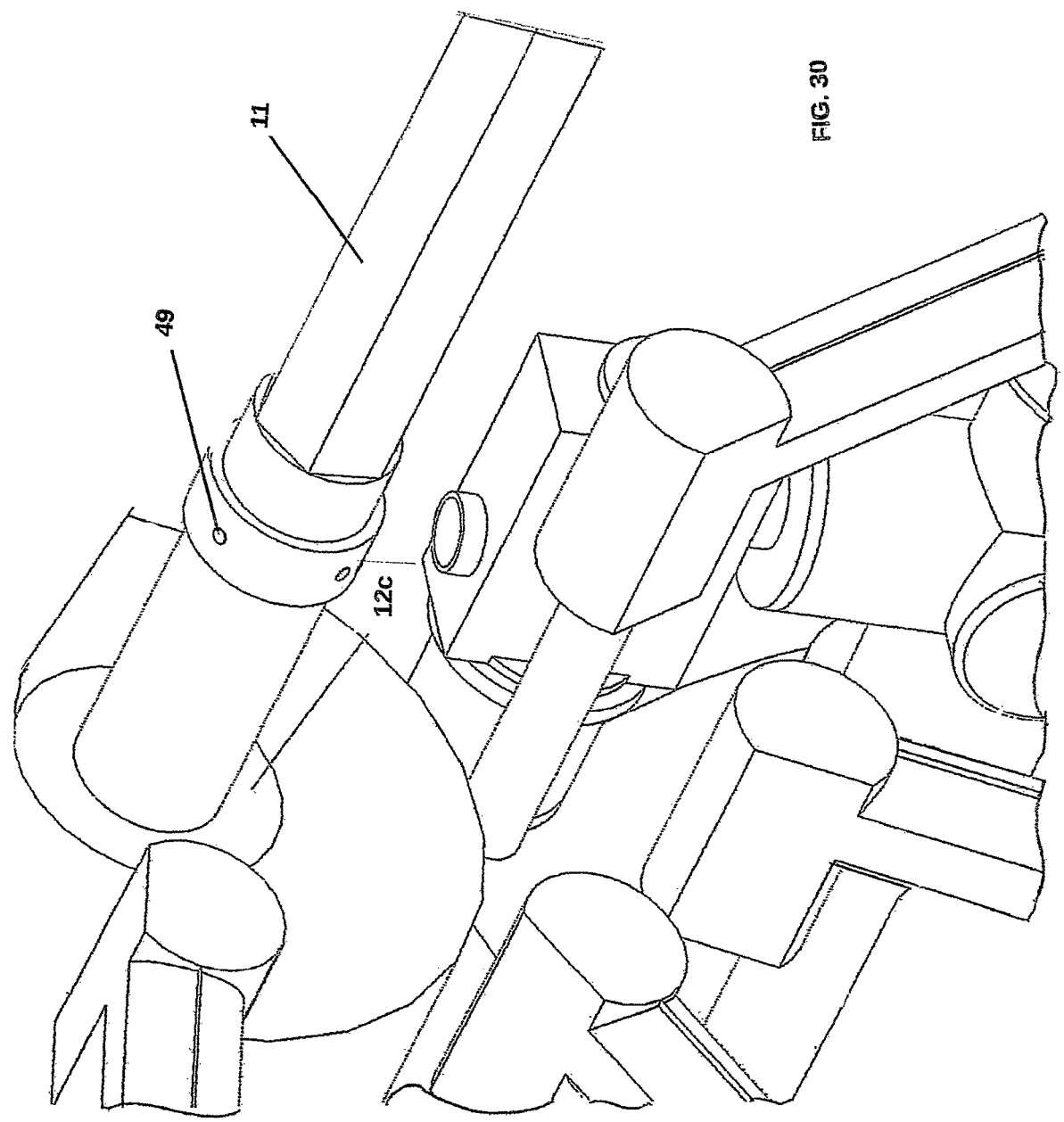
FIG. 30 presents the turbine blades and inner shroud assembly

FIG. 30 presents the turbine blades and inner shroud assembly 35 including 16 turbine blades 37 with aerodynamic cross-section and with a helical pattern that is bolted to the inner shroud. The turbine inner shroud 34 is bolted to the nose 36 creating inner shroud and nose assembly 38 which rotates with close radial proximity to the turbine outer shroud 34a that is bolted to the divergence manifold flow adaptor 34c.

Figure 31:
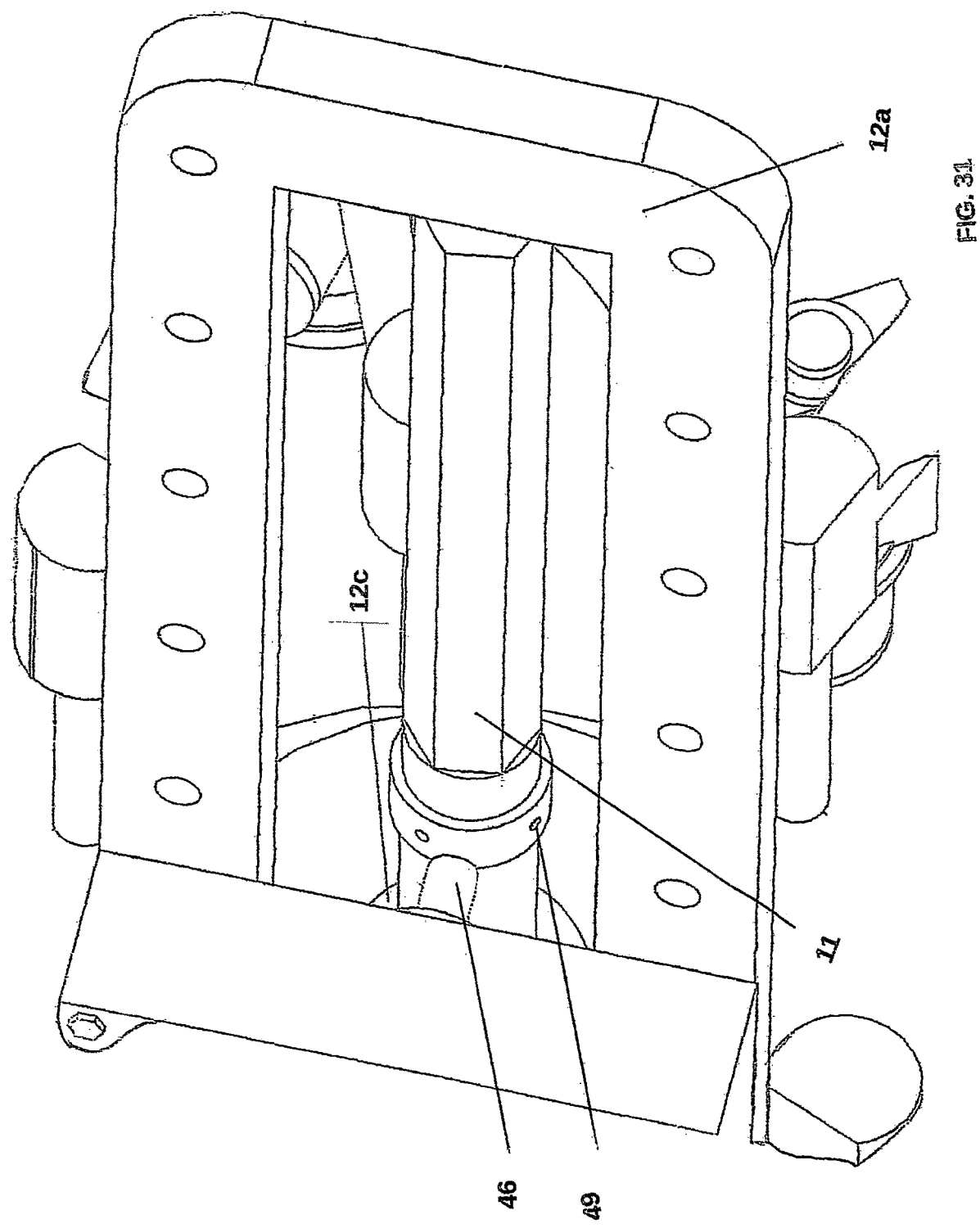
FIG. 31 presents the turbine blades turning under supersonic airflow speed impulse.

FIG. 31 presents the turbine blades 37 turning under supersonic airflow speed impulse, converting airflow speed kinetic energy into turbine blades and inner shroud 35 fast rotation over turbine ball bearings 45 mounted to air-tank rear turbine support 12b.

Figure 32:
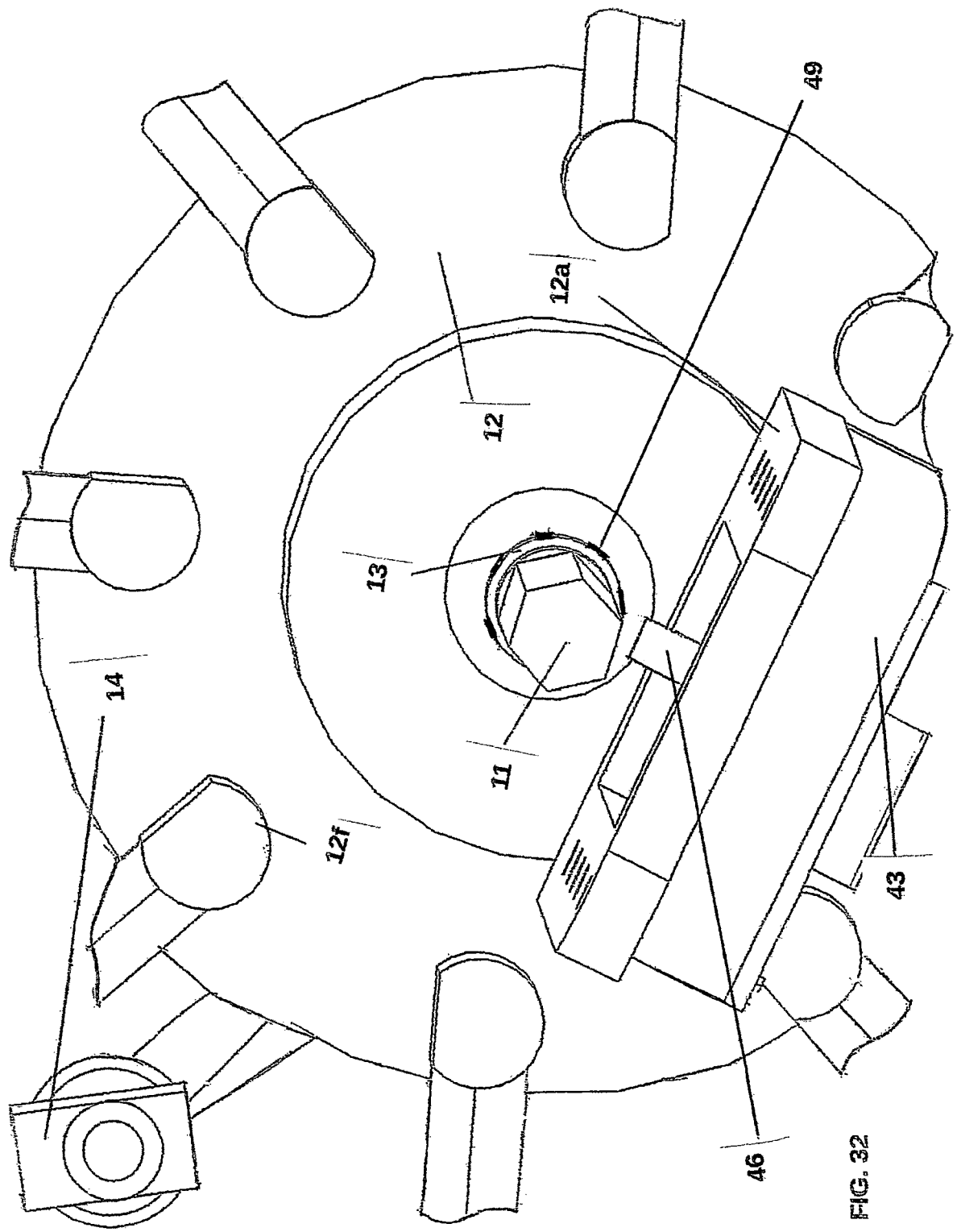
FIG. 32 presents a turbine aerodynamically rounded turbine nose with multiple radial turbine nose radical fins

FIG. 32 presents a turbine aerodynamically rounded nose 36 with multiple radial turbine nose radical fins 36a. bolted to inner shroud 34 and bolted to the end of engine outlet shaft 11, making turbine rotation speed the same as engine output shaft rotation speed with inner shroud and nose assembly 37 turning around the turbine bearings 45 supported by air-tank rear turbine support 12b.

Figure 33:
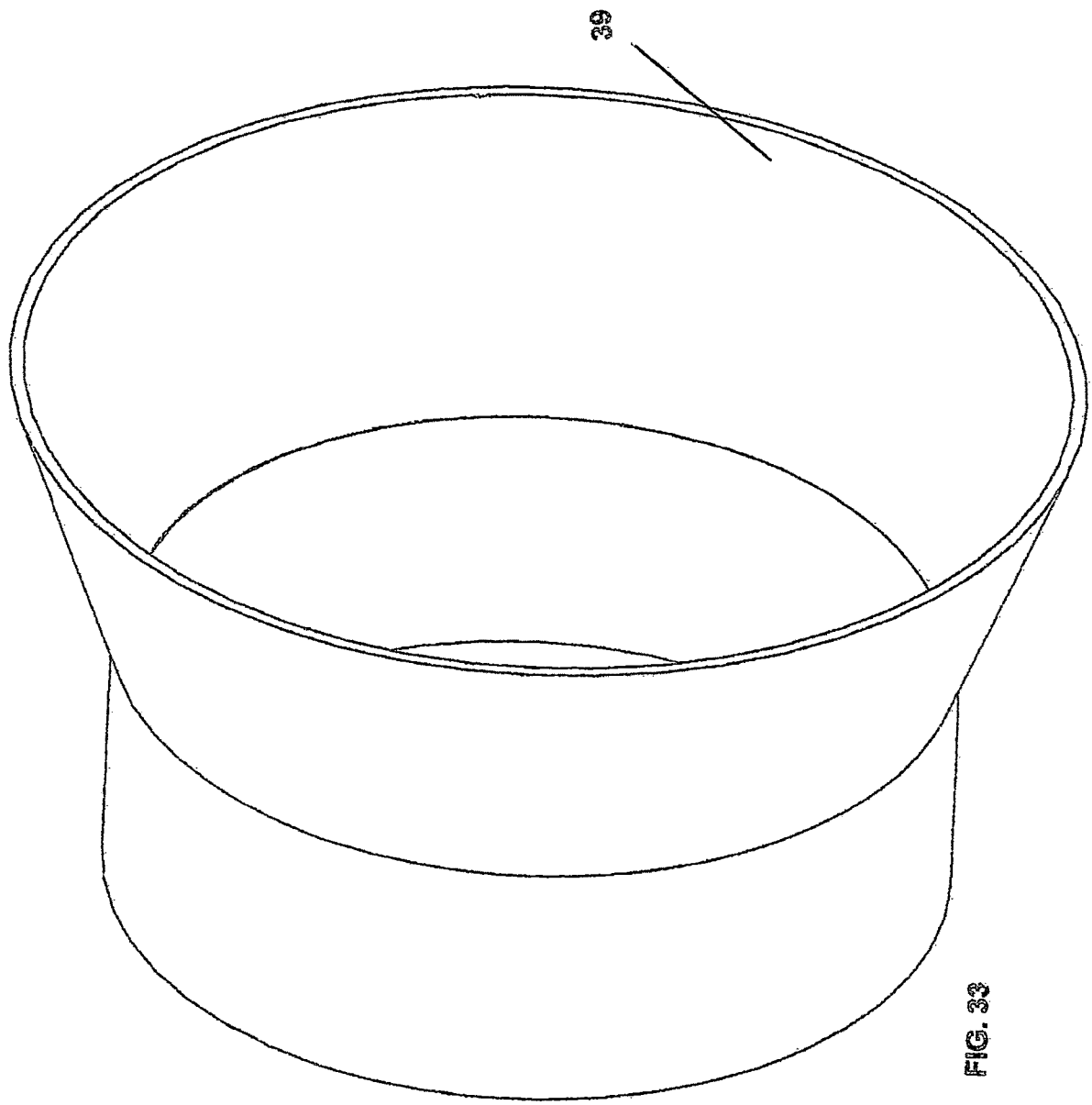
FIG. 33 presents the turbine outer shroud flow adaptor bolted to the divergence manifold chamber outlet diameter.

FIG. 33 presents the turbine outer shroud flow adaptor 33a bolted to the divergence manifold chamber outlet diameter, funneling the supersonic airflow into the turbine outer shroud 34a.

Figure 34:
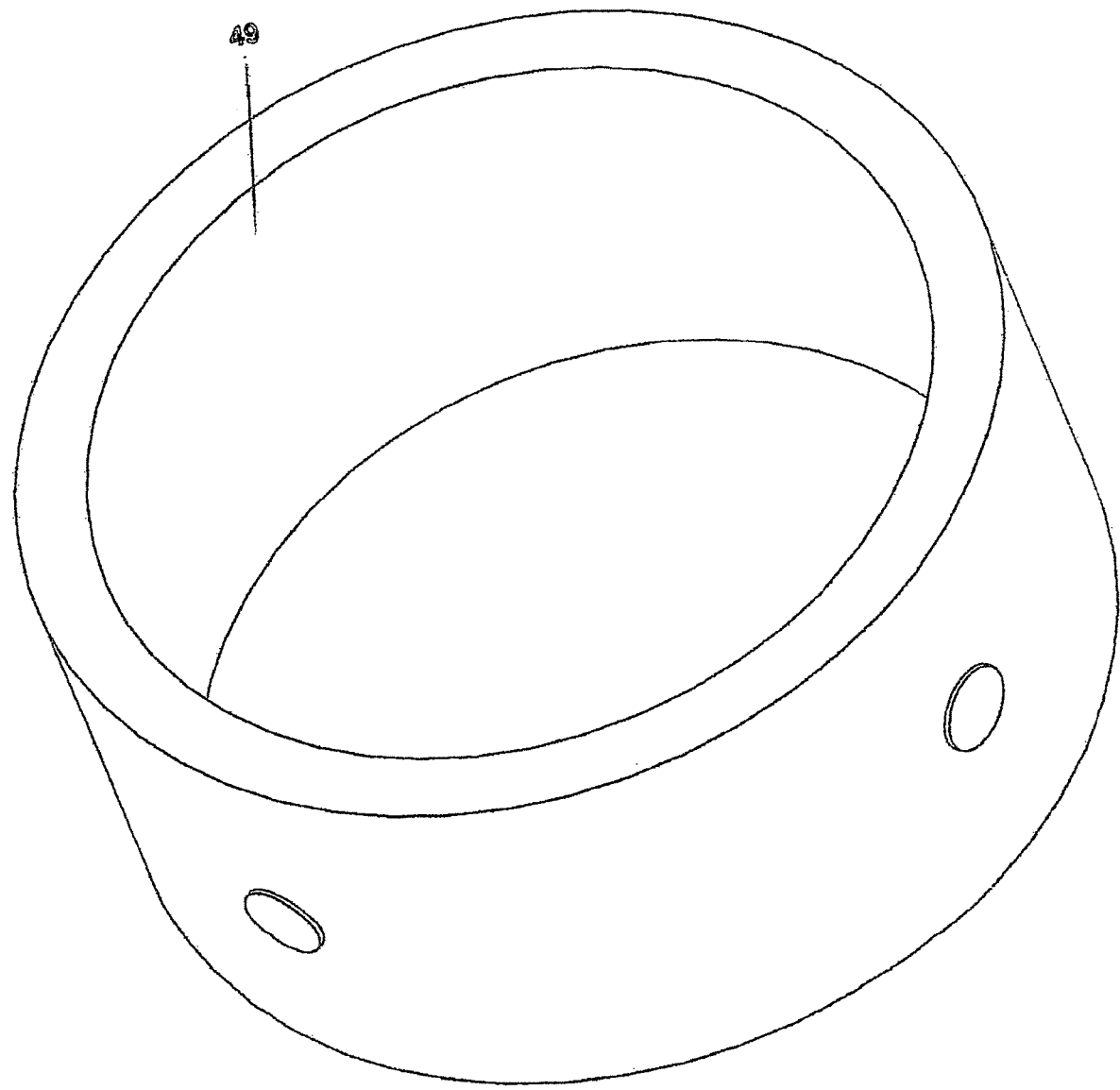
FIG. 34 presents the turbine divergence shroud bolted to the outer shroud

FIG. 34 presents the turbine divergence shroud 39 bolted to outer shroud 34a, wherein airflow exiting turbine blades at subsonic speed, low temperature, and low pressure into the ambient atmosphere.

Figure 35:
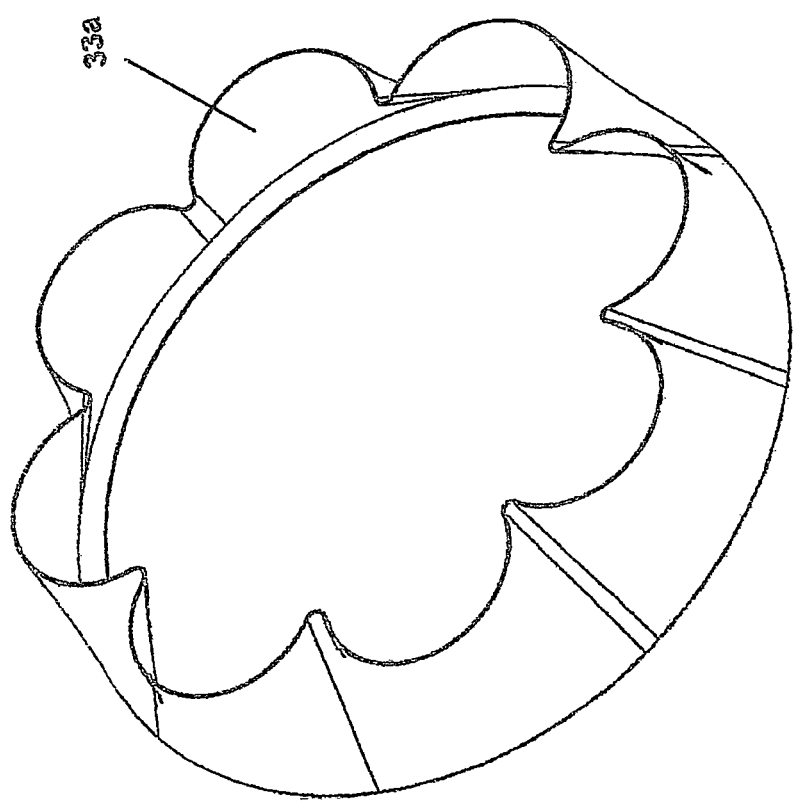
FIG. 35 presents an electronic pulse generator bolted to the air-tank front flange

FIG. 35 presents an electronic pulse generator 43 bolted to air-tank front flange 12a, controlling the speed of engine output shaft 11 in a closed loop by providing controlled rectangular short-duration pulses varying in voltage, time duration, and sequence to two opposing manifolds of the total eight manifolds numbered as #1 & #5, #2 & #6, #3 & #7 and #4 & #8 at a time.

Figure 36:
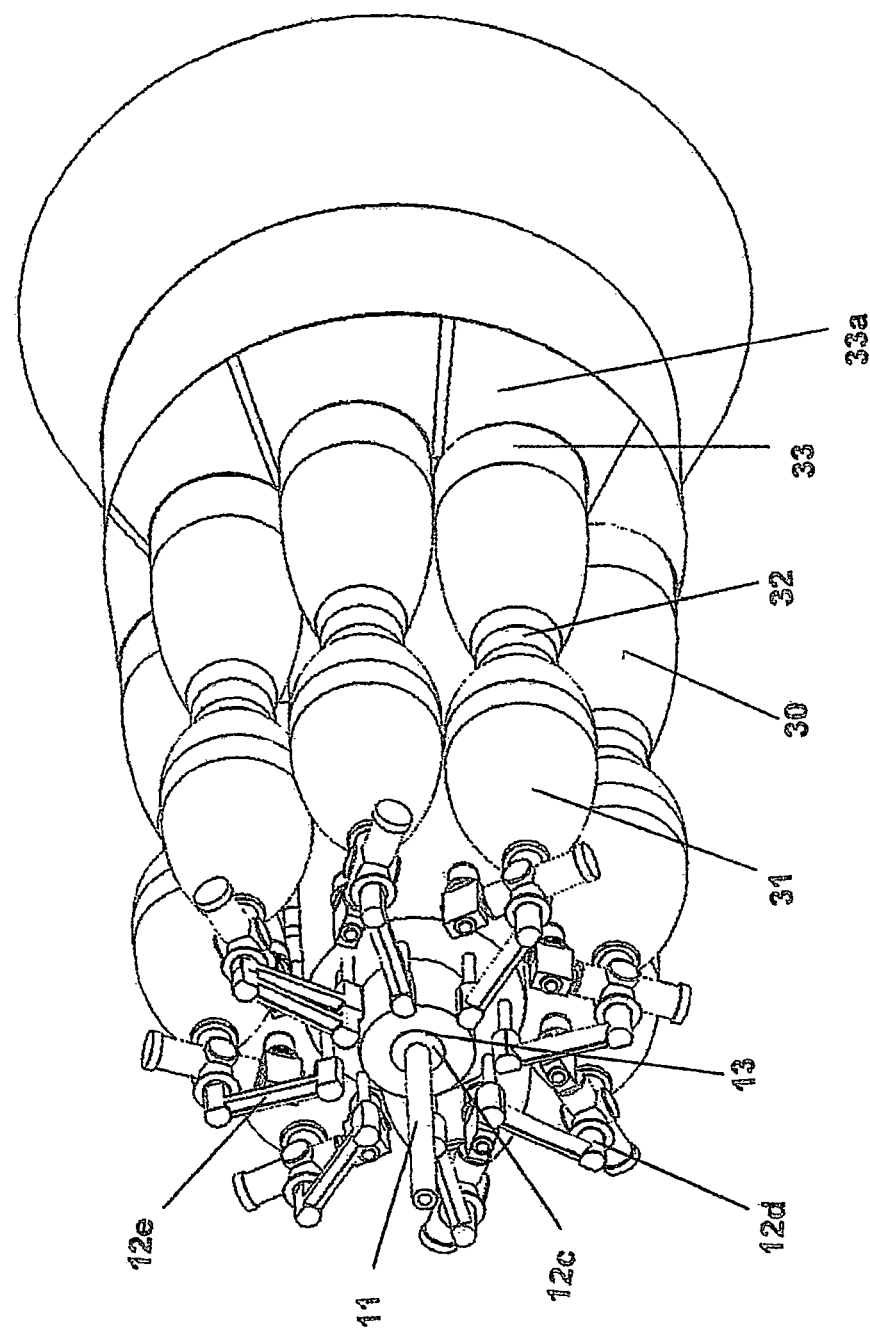
FIG. 36 presents multiple ring magnets mounted radially on a non-magnetic ring

FIG. 36 presents multiple magnets 47 mounted radially on a non-magnetic ring 49 bolted concentrically to said outlet shaft 11, thereby the non-magnet ring rotates at shaft speed in close proximity to said magnetic reed switches sensors that are bolted to said air tank front flange, thereby producing an electrical signal for controlling the speed of said output shaft in closed loop.

Figure 37:
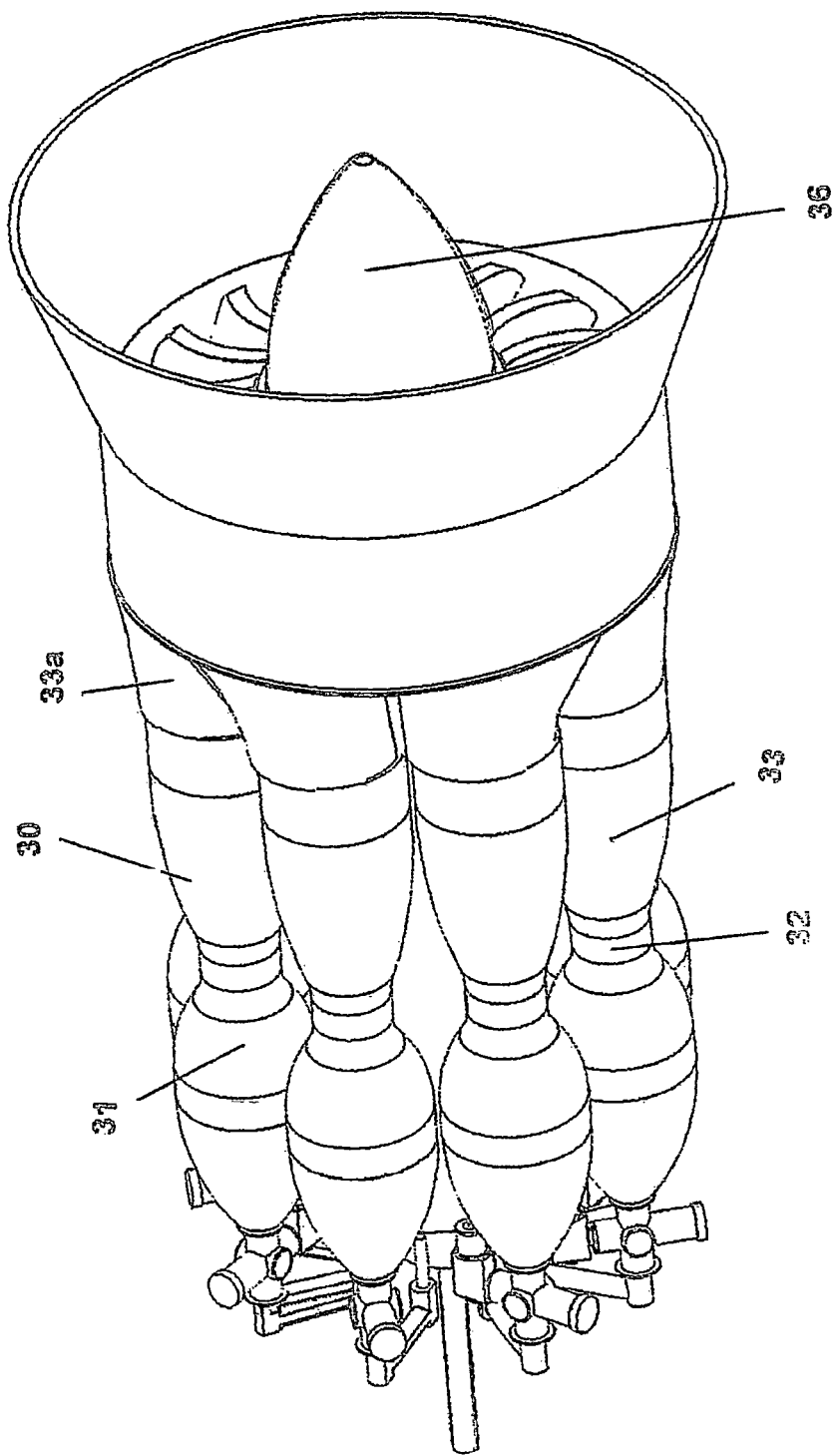
FIG. 37 presents a reed switch sensor bolted to said air-tank front flange.

FIG. 37 presents a reed switch sensor 46 bolted to said air-tank front flange 12a. The reed switch produces an electrical output signal proportional to the output shaft speed to the electronic pulse generator 43 when a rotating magnet is embedded non-magnetic ring 47 is passing in proximity to the non-magnetic ring reed switch.

Figure 38:
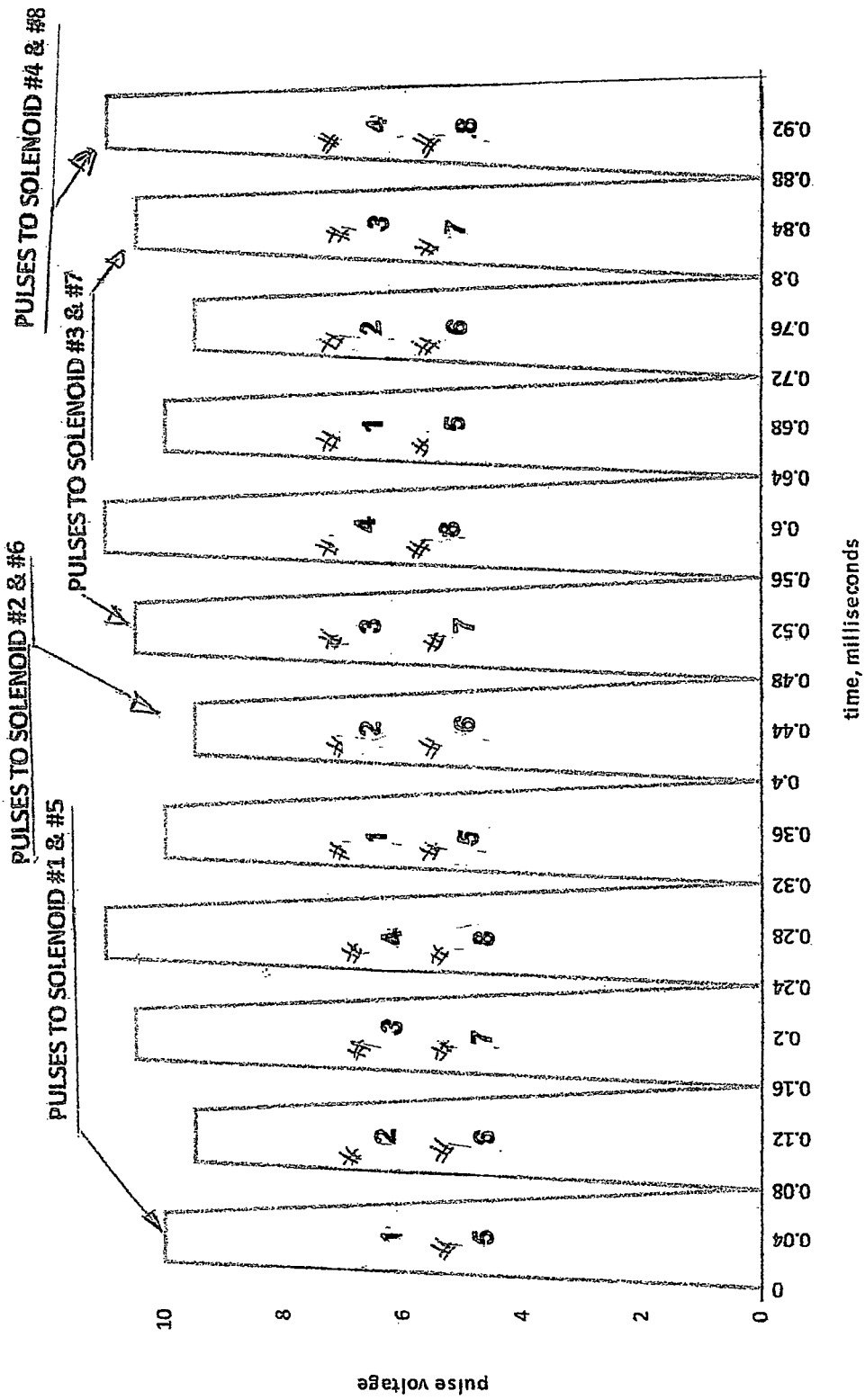
FIG. 38 presents a sample graph presenting pulses provided to manifolds numbered as #1 & #5, #2 & #6, #3 & #7, and #4 & #8

FIG. 38 presents a sample graph presenting pulses provided to manifolds numbered as #1 & #5, #2 & #6, #3 & #7, and #4 & #8 by electronic pulse generator 43. The engine output speed is controlled by providing controlled rectangular short-duration pulses varying in voltage, time duration, and sequence to two opposing manifolds of a total of eight at a time.

The invention claimed is:

1. An electronically speed controlled pulsed supersonic turbine engine energized by clean breathable air from an extremely high pressure renewable energy air stored in a cylindrical mobile air tank with an output shaft coupled with an automotive input power shaft or coupled with a generator input shaft, with an output shaft speed controlled in a closed loop using an electronically controlled pulse generator controller set to a predetermined engine output shaft speed, the electronically controlled pulse generator controller sending short time electrical voltage pulses to eight fast opening solenoid valve and spool valve assemblies, each comprising a solenoid valve and a spool valve, and the short time electrical voltage pulses being programmable in amplitude, frequency, sequence and time duration, comprising:

a. the cylindrical mobile air tank with a front end flange and an air tank rear cylindrical extension in a rear of the cylindrical mobile air tank with an air tank through center hole, the cylindrical mobile air tank storing a large amount of the extremely high-pressure renewable energy air, supporting output shaft bearings and turbine bearings, and supporting turbine rotation and output shaft rotation, comprising,
  1. The air tank through center hole supporting the output shaft bearings and the output shaft rotation within said air tank through center hole with a non-magnetic ring, and
  2. An air-tank relief valve preventing overpressure of said extremely high pressure renewable energy air in the cylindrical mobile air tank, and
  3. The air tank front end flange supporting a magnetic output shaft speed sensor and the electronically controlled electronic pulse generator controller, connected with bolts to an automotive structural chassis, and supporting the engine to the structural chassis, and
  4. Eight air tank outlet ports connected to the eight solenoid valves by connecting pipes, the solenoid valves controlling airflow to the engine, and
  5. The air tank rear cylindrical extension supporting the turbine bearings, and
b. eight De Laval convergent-divergent CD nozzle systems, each connected to a respective fast opening solenoid valve and spool valve assembly, thereby the high pressure renewable energy air from the cylindrical mobile air tank is provided to each De Laval convergent-divergent CD nozzle system at sequential timing, each comprising:
  1. A convergent manifold chamber connecting between a spool valve outlet port and the choked nozzle, wherein the airflow is supplied to the convergence manifold chamber at a subsonic speed, and
  2. The choked nozzle with a diameter connecting between the convergence manifold chamber and downstream to a divergence manifold chamber, wherein airflow speed through the choked nozzle is kept sonic at a Mach number equal to 1 which is the speed of sound, and
  3. A divergence manifold chamber connecting between the choked nozzle and an turbine outer shroud flow adaptor wherein the airflow speed is accelerating to a supersonic speed with the Mach number larger than 1 when leaving the choked nozzle, but less than 1.2 to avoid shocks, and
c. the solenoid valve with a solenoid valve inlet port connected to said cylindrical mobile air tank and with a solenoid valve outlet port connected to a spool valve command inlet port, wherein the solenoid valve is actuated by the short time electric voltage pulses and is connected to the spool valve command inlet port, comprising:
  1. A fast opening magnetic solenoid energized by the short time electric voltage pulses from the electronically controlled pulse generator controller to open said solenoid valve for a very short time to fluidly connect the spool valve command inlet port, and
  2. A solenoid plunger with a conical poppet having a sealing surface, wherein the conical poppet provides a tight seal against a sealing seat, and
  3. A solenoid valve body with the solenoid valve inlet port connected to said cylindrical mobile air tank and with the solenoid valve outlet port connected to the spool valve command inlet port, and,
  4. A solenoid valve helical spring, wherein said solenoid valve helical spring pushes said solenoid plunger to a closed position, keeping the solenoid valve in a sealed closed position when the solenoid valve is not energized, and
  5. The solenoid valve inlet port connected to said cylindrical mobile air tank, and
  6. the solenoid valve outlet port connected to said spool valve command inlet port wherein when said solenoid valve is in an open position, the solenoid valve provides the extremely high pressure renewable energy air to the spool valve command inlet port to move a spool valve cylindrical spool to an open position, and
e. the spool valve with the spool valve command inlet port connected to the solenoid valve outlet port, a spool valve inlet port connected to the cylindrical mobile air tank, and a spool valve outlet port connected to said convergence chamber manifold, comprising:
  1. A spool valve body with a spool valve bore, the spool valve command inlet port, a spool valve command outlet port, the spool valve inlet port and the spool valve outlet port, comprising
  2. The spool valve cylindrical spool with an axial center through hole, wherein said the spool valve cylindrical spool is sliding axially inside said spool valve bore to the open position under command port pulse pressure from said solenoid valve outlet port, and
  3. A spool valve helical return spring between said spool valve cylindrical spool and a bottom cover of said spool bore, wherein said helical spring applies an axial force on said spool valve cylindrical spool, pushing said spool valve cylindrical spool to a closed position, and
  4. The spool valve command inlet port connected axially into a radially inner side of said spool bore and to the solenoid valve outlet port to apply a fast and short duration of pressurized air axial force on a radially inner side of the spool valve cylindrical spool for rapid movement to the open position of the spool valve cylindrical spool, and,
  5. The spool valve inlet port connected to the cylindrical mobile air tank by a connecting pipe of the connecting pipes, and,
  6. The spool valve outlet port connected to said convergence manifold chamber, wherein the spool valve provides the extremely high pressure renewable energy air to the convergence manifold chamber at the subsonic speed, and
f. 16 turbine blades with a helical pattern bolted around an inner shroud and nose assembly with close radial proximity to a turbine outer shroud, wherein said turbine blades are turning under supersonic airflow speed impulse converting the airflow speed to the turbine rotation at a controlled speed with a nose coupled with said output shaft to transfer turbine rotation to the output shaft, and
g. the turbine inner shroud and nose assembly with the turbine blades bolted to the output shaft and supporting a turbine ball bearing outer diameter, wherein a turbine ball bearing inner diameter is mounted to the air tank rear cylindrical extension, and a turbine rotation speed is the same as an output shaft rotation speed, and
h. the turbine outer shroud flow adaptor bolted to a divergence manifold chamber outer diameter and to the turbine divergence shroud, and i. the turbine divergence shroud bolted to the turbine outer shroud flow adaptor, wherein the airflow exiting the turbine blades is at a low ambient atmosphere pressure, and
j. an electronic pulse generator speed control system of the output shaft, wherein the output shaft rotation speed is controlled in the closed loop by the electronically controlled pulse generator controller and the magnetic output shaft speed sensor, the non-magnetic ring with embedded magnets mounted on the output shaft, comprising:
  1. The non-magnetic ring with the embedded magnets bolted radially to the output shaft, wherein the non-magnet ring with the embedded magnets rotates at the same speed as the output shaft while in close proximity to the magnetic output shaft speed sensor,
  2. The magnetic output shaft speed sensor bolted to the air tank front end flange, wherein the magnetic output shaft speed sensor includes a reed switch that produces an electrical signal to the electronically controlled electronic pulse generator controller when a rotating magnet of the embedded magnets of the non-magnetic ring passes in close proximity and
  3. The electronically controlled pulse generator controller is bolted to the air tank front end flange, wherein said electronically controlled pulse generator controller is programmable to produce the short time electrical voltage pulses of a predetermined amplitude, time duration, frequency and synchronization between the solenoid valves.

* * * * *